US011250421B2

(12) United States Patent
Sharp et al.

(10) Patent No.: US 11,250,421 B2
(45) Date of Patent: Feb. 15, 2022

(54) STORING SECURE CREDENTIAL INFORMATION IN DIFFERENT REGIONS

(71) Applicant: Apple Inc., Cupertino, CA (US)

(72) Inventors: Christopher B. Sharp, San Jose, CA (US); Yousuf H. Vaid, Sunnyvale, CA (US); Vineet Chadha, Santa Cruz, CA (US); Matthew C. Byington, Los Altos, CA (US); Bhaskar Korlipara, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 854 days.

(21) Appl. No.: 15/017,419

(22) Filed: Feb. 5, 2016

(65) Prior Publication Data

US 2016/0232521 A1  Aug. 11, 2016

Related U.S. Application Data

(60) Provisional application No. 62/113,483, filed on Feb. 8, 2015.

(51) Int. Cl.
*G06Q 20/38* (2012.01)
*G06Q 20/32* (2012.01)
*G06Q 20/02* (2012.01)

(52) U.S. Cl.
CPC ......... *G06Q 20/3821* (2013.01); *G06Q 20/02* (2013.01); *G06Q 20/3224* (2013.01); *G06Q 20/3229* (2013.01)

(58) Field of Classification Search
CPC ......... H04L 63/08; H04L 9/14; H04L 63/061; H04L 9/30; H04L 49/201; H04L 63/04;
(Continued)

(56) References Cited

U.S. PATENT DOCUMENTS 6,422,462 B1 * 7/2002 Cohen ................. G06Q 20/105
235/380
8,196,131 B1   6/2012 von Behren et al.
(Continued)

FOREIGN PATENT DOCUMENTS

CN        1849632 A    10/2006
CN      101014985 A     8/2007
(Continued)

OTHER PUBLICATIONS

Ron White, How Computers Work, Oct. 15, 2003, Que Publishing, 7th Ed. (Year 2003) (Year: 2003).*
(Continued)

*Primary Examiner* — John W Hayes
*Assistant Examiner* — Nakia Leffall-Allen
(74) *Attorney, Agent, or Firm* — Sterne, Kessler, Goldstein & Fox P.L.L.C.

(57) ABSTRACT

An electronic device may attempt to provision an unprovisioned credential, such as a payment instrument, by providing a message with information specifying the unprovisioned credential to a first computer. This first computer may be associated with a first region in which: a first provisioned credential of a user is supported, the user has registered, and the user can conduct transactions based on the first provisioned credential. However, the unprovisioned credential may be supported in or otherwise associated with a second region. Consequently, the electronic device may receive, from the first computer, redirect information that specifies a second computer associated with the second region. In response, the electronic device can provide the message to the second computer. Further, the electronic device can communicate provisioning information for the unprovisioned credential with the second computer, so the credential can be provisioned.

20 Claims, 10 Drawing Sheets

(58) Field of Classification Search

CPC ..... H04L 63/083; H04L 63/105; H04L 9/321; H04L 45/22; H04L 45/28; H04L 45/306; H04L 45/50; H04L 63/06; H04L 63/102; H04L 63/12; H04L 63/123; H04L 63/16; H04L 63/168; H04L 63/20; H04L 67/10; H04L 69/40; H04L 9/006; H04L 9/083; G06Q 20/401; G06Q 20/382; G06Q 20/385; G06Q 20/322; G06Q 20/20; G06Q 20/40; G06Q 20/327; G06Q 20/02; G06Q 20/065; G06Q 20/10; G06Q 20/12; G06Q 20/32; G06Q 30/06; G06Q 20/204; G06Q 20/367; G06Q 20/36; G06Q 20/409; G06Q 20/202; G06Q 20/325; G06Q 20/34; G06Q 40/02; G06Q 20/102; G06Q 20/14; G06Q 20/363; G06Q 20/405; G06Q 20/425; G06Q 30/0601; G06Q 20/00; G06Q 20/027; G06Q 20/06; G06Q 20/085; G06Q 20/108; G06Q 20/18; G06Q 20/223; G06Q 20/24; G06Q 20/341; G06Q 20/354; G06Q 20/04; G06Q 20/045; G06Q 20/0453; G06Q 20/08; G06Q 20/145; G06Q 20/28; G06Q 20/352; G06Q 20/389; G06Q 20/40975; G06Q 20/42; G06Q 20/0207; G06Q 30/0635; G06Q 40/00; G06Q 10/087; G06Q 20/105; G06Q 20/123; G06Q 20/206; G06Q 20/209; G06Q 20/26; G06Q 20/29; G06Q 20/342; G06Q 20/346; G06Q 20/347; G06Q 20/353; G06Q 20/355; G06Q 20/38; G06Q 20/381; G06Q 20/383; G06Q 30/02; G06Q 40/04; G06Q 50/01; G06F 21/44; G06F 19/00; G06F 21/31; G06F 21/606; G06F 21/64; G06F 16/955; G06F 21/10; G06F 21/105; G06F 21/32; G06F 21/335; G06F 21/445; G06F 21/53; G06F 21/57; G06F 21/602; G06F 21/604; G06F 21/62; G06F 21/73; G06F 21/83; G06F 21/86; G06F 3/041

See application file for complete search history.

(56) References Cited

U.S. PATENT DOCUMENTS

| | | | | |
|---|---|---|---|---|
| 8,639,629 | B1* | 1/2014 | Hoffman | G06Q 20/3821 705/67 |
| 2002/0194124 | A1* | 12/2002 | Hobbs | G06Q 20/10 705/39 |
| 2005/0222961 | A1* | 10/2005 | Staib | H04M 1/0254 705/64 |
| 2006/0165060 | A1* | 7/2006 | Dua | G06Q 20/20 370/352 |
| 2006/0224470 | A1 | 10/2006 | Garcia Ruano et al. | |
| 2007/0078761 | A1 | 4/2007 | Kagan et al. | |
| 2008/0249913 | A1* | 10/2008 | Chan | G06Q 40/00 705/35 |
| 2011/0113477 | A1 | 5/2011 | Miyabayashi et al. | |
| 2011/0276476 | A1 | 11/2011 | Kim | |
| 2012/0159148 | A1* | 6/2012 | Behren | G06Q 20/3552 713/150 |
| 2012/0276872 | A1* | 11/2012 | Knauth | H04W 12/069 455/411 |
| 2012/0316992 | A1 | 12/2012 | Oborne | |
| 2013/0013505 | A1* | 1/2013 | Bryant | G06Q 20/22 705/44 |
| 2013/0317928 | A1* | 11/2013 | Laracey | G06Q 20/322 705/21 |
| 2014/0108263 | A1* | 4/2014 | Ortiz | G06Q 20/38215 705/71 |
| 2014/0279332 | A1* | 9/2014 | Poole | G06Q 20/3224 705/35 |
| 2014/0379556 | A1* | 12/2014 | Choi | G06Q 20/24 705/39 |
| 2015/0019418 | A1* | 1/2015 | Hotard | G06Q 20/36 705/41 |
| 2017/0352018 | A1* | 12/2017 | Cooper | G06Q 20/28 |

FOREIGN PATENT DOCUMENTS

| | | |
|---|---|---|
| CN | 101989998 A | 3/2011 |
| CN | 102282583 A | 12/2011 |
| CN | 103765454 A | 4/2014 |

OTHER PUBLICATIONS

Ron White, How Computers Work, Oct. 15, 2003, Que Publishing, 7th Ed. (Year: 2003).*

International Search Report and Written Opinion for PCT Appl. No. PCT/US2016/016965, filed Feb. 8, 2016, 12 pages, dated Apr. 20, 2016.

Office Action directed to related European Patent Application No. 16704373.6, dated Feb. 20, 2019; 9 pages.

Office Action directed to related Chinese Patent application No. 201680009187.9, dated Apr. 2, 2020, with attached English-language translation; 38 pages.

International Preliminary Report on Patentability for PCT Appl. No. PCT/US2016/016965, filed Feb. 8, 2016, 7 pages, dated Aug. 8, 2017.

Summons to Attend Oral Proceedings directed to related European Patent Application No. 16704373.6, dated Nov. 16, 2020; 10 pages.

* cited by examiner

STORING SECURE CREDENTIAL INFORMATION IN DIFFERENT REGIONS

This application claims priority to application Ser. No. 62/113,483 filed Feb. 8, 2015, which is hereby incorporated by reference in its entirety.

BACKGROUND

Field

The described embodiments relate generally to the storage of electronic data including the storage of secure credentials associated with a wireless electronic device.

Related Art

Many modern electronic devices typically include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Wash.), and/or another type of wireless interface (such as a near-field-communication or NFC interface).

There is presently interest in using such electronic devices to conduct secure transactions, including financial transactions. To facilitate these transactions, an electronic device may include a secure element to provide: security, confidentiality, and one or more application environments. The secure element may support one or more applets or applications (such as a payment applet associated with a credit card) that execute in an environment of the secure element, where the applets enable the secure element to conduct a financial transaction with another electronic device, such as a point-of-sale terminal (such applets are sometimes referred to as 'payment instruments').

SUMMARY

Provided herein are system, method and/or computer program product embodiments, and/or combinations and sub-combinations thereof, for provisioning electronic credentials associated with a wireless electronic device, and providing a view of the electronic credentials, even when the data for the electronic credentials may be stored in multiple, separate regions.

In some embodiments, an electronic device (such as a cellular telephone) includes: an antenna; and an interface circuit that wirelessly communicates with one or more computers. During operation, the electronic device receives information specifying an unprovisioned payment instrument. Further, the electronic device provides, via the interface circuit, a message based on the information to a first computer accessible at a first location in a network, where the first computer is associated with a first region in which: a first provisioned payment instrument of a user is supported, the user has registered, and the user can conduct, via the electronic device and/or another electronic device, transactions (such as financial transactions) based on the first provisioned payment instrument. Moreover, the electronic device receives, via the interface circuit, redirect information from the first computer, where the redirect information specifies a second computer accessible at a second location in the network, and the second computer is associated with a second region in which the unprovisioned payment instrument is supported. The electronic device further provides, via the interface circuit, the message to the second computer at the second location. Additionally, the electronic device communicates, via the interface circuit, provisioning information between the electronic device and the second computer, so that the second payment instrument is provisioned to become a second provisioned payment instrument, where the user can conduct, via the electronic device and/or the other electronic device, transactions based on the second provisioned payment instrument in the second region.

In some embodiments, the information may include: an image of the unprovisioned payment instrument; and/or a numerical identifier associated with the unprovisioned payment instrument.

Moreover, in some embodiments, the first provisioned payment instrument and the second provisioned payment instrument may be: a debit card, a credit card, or both. However, either or both of the first provisioned payment instrument and the second provisioned payment instrument may represent another type of payment instrument, such as a prepaid card, a club card, a membership card, a reward card, a loyalty card, a transit pass, or any other such instrument. Accordingly, various embodiments are applicable to non-financial applications. For example, an exemplary embodiment may involve a club or organization having presence in multiple regions, wherein access or credentialing for a given club member may be limited to a certain region. If the club member wishes to access club locations or amenities in other regions, the member's club credentials may be authorized for those other regions using technologies described herein. Accordingly, various embodiments may be applicable to applications where access, authorization, credentialing etc. is geographically limited.

Furthermore, the message may include an encrypted version of the information.

Additionally, the first location and the second location may be specified by uniform resource locators (URLs).

In some embodiments, the redirect information includes: a redirect having Hypertext Transfer Protocol (HTTP) status code 301, a redirect having HTTP status code 307, and/or a redirect having HTTP status code 308.

Moreover, prior to providing the message to the second computer, the electronic device may exchange, via the interface circuit, registration information with a third computer in order to register the user in the second region.

Furthermore, the first computer may store financial information associated with the first provisioned payment instrument. After the unprovisioned payment instrument is provisioned to become the second provisioned payment instrument, the second computer may store second financial information associated with the second provisioned payment instrument in accordance with regulations associated with the second region.

Other embodiments provide a computer-program product for use in conjunction with the electronic device. This computer-program product may include instructions stored on any non-transitory computer readable medium for at least some of the aforementioned operations performed by the electronic device. Such instructions, when executed by one or more processors, causes the one or more processors to operate as described herein.

Other embodiments provide a method for provisioning the unprovisioned payment instrument, which may be performed, partially or entirely, by the electronic device. During the method, the electronic device performs at least some of the aforementioned operations performed by the electronic device.

Still other embodiments provide a computer system that includes the first computer. The first computer may include: an interface circuit that communicates with one or more computers and electronic devices; a processor communicatively coupled to the interface circuit; and memory communicatively coupled to the processor, where the memory may be any non-transitory computer readable medium that stores one or more program modules that may be executed by the processor. The one or more program modules include instructions for: receiving, via the interface circuit, the message from the electronic device that includes the information specifying the unprovisioned payment instrument; determining that the unprovisioned payment instrument is associated with the second region that differs from the first region associated with the first computer, where in the first region: the first provisioned payment instrument of the user is supported, the user is registered, and the user can conduct, via the electronic device and/or the other electronic device, the transactions using the first provisioned payment instrument; and providing, via the interface circuit, the redirect information to the electronic device, where the redirect information specifies the second computer accessible at the second location in the network, and where the second computer is associated with the second region in which the unprovisioned payment instrument is supported.

Moreover, the computer system may include the second computer. The second computer may include: a second interface circuit that communicates with one or more of the computers and the electronic devices; a second processor communicatively coupled to the second interface circuit; and second memory communicatively coupled to the second processor, where the second memory stores a second program module, and the second program module may be executed by the second processor. The second program module may include instructions for: receiving, via the second interface circuit, the message from the electronic device; and communicating, via the second interface circuit, the provisioning information between the electronic device and the second computer so that the unprovisioned payment instrument is provisioned to become the second provisioned payment instrument, where the user can conduct, via the electronic device and/or the other electronic device, the transactions based on the second provisioned payment instrument in the second region.

In some embodiments, prior to the instructions for receiving the message from the electronic device, the second program module includes instructions for registering, via the second interface circuit, the user in the second region.

Other embodiments provide a computer-program product for use in conjunction with the computer system. This computer-program product may include instructions for at least some of the aforementioned operations performed by the computer system.

Still other embodiments provide a method for provisioning the unprovisioned payment instrument, which may be performed by the computer system. During the method, the computer system performs at least some of the aforementioned operations performed by the computer system.

In other embodiments, a non-transitory computer-readable medium includes instructions stored, which when executed by a processor in an electronic device cause the processor to perform operations. The operations include registering for a first time with a first computer in a first region, where the first computer is a primary pod, and accessing a payment instrument that is unprovisioned. The operations also include requesting provisioning of the unprovisioned payment instrument from the first computer, and receiving redirect information from the first computer, where the redirect information identifies a second region supporting the unprovisioned payment instrument. When the unprovisioned payment instrument is eligible for provisioning in the second region, the operations also include requesting provisioning of the unprovisioned payment instrument from a second computer in the second region, and storing a personalized script in a secure element of the electronic device, where the personalized script is associated with the payment instrument.

In other embodiments, a computer system in a region includes an antenna and one or more processors, where the one or more processors can receive from an electronic device, information associated with an unprovisioned payment instrument. When the unprovisioned payment instrumented is supported by a different region, the one or more processors can transmit redirect information to the electronic device identifying the different region. When the unprovisioned payment instrument is supported in the region, the one or more processors can initiate a new card check for the unprovisioned payment instrument with a payment network operator (PNO) in the region, communicate with the PNO to link a Financial Primary Account Number (FPAN) of the unprovisioned payment instrument with a Device Primary Account Number (DPAN), and provide image data associated with the payment instrument when the payment instrument is provisioned in the region.

The preceding summary is provided for purposes of summarizing some exemplary embodiments to provide a basic understanding of aspects of the subject matter described herein. Accordingly, the above-described features are only examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same object or object type are designated by a common prefix separated from an instance number by a dash.

DETAILED DESCRIPTION

An electronic device (such as a cellular telephone) may attempt to provision an unprovisioned secure credential, such as a payment instrument by providing a message with information corresponding to the unprovisioned credential to a first computer. This first computer may be associated with a first region in which: a first provisioned credential of a user is supported, the user has been registered, and the user can conduct, via the electronic device and/or another electronic device, transactions (such as financial transactions or other secure transactions) based on the first provisioned payment credential. However, the unprovisioned credential may be supported in or otherwise associated with a second region. (In some instances, the unprovisioned credential may not be supported in the first region, i.e., the unprovisioned credential may be supported only in a second region.) Consequently, the electronic device may receive, from the first computer, redirect information that specifies a second computer associated with the second region. In response, the electronic device provides the message to the second computer. Then, the electronic device communicates provisioning information with the second computer, so that the second credential is provisioned to become a second provisioned credential. In this way, the user can conduct transactions using the second provisioned credential.

The communication of the message and the provisioning information may involve wireless and/or wired communication between the electronic device and the first computer or the second computer. This wireless communication may involve conveying packets that are transmitted and received by radios in the electronic device in accordance with a communication protocol, such as: an Institute of Electrical and Electronics Engineers (IEEE) 802.11 standard, Bluetooth™ (from the Bluetooth Special Interests Group of Kirkland, Wash.), and/or another type of wireless interface, such as a near-field-communication (NFC) standard or specification (from the NFC Forum of Wakefield, Mass.). In addition, the communication protocol may be compatible with a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In the discussion that follows, a cellular-telephone communication technique is used as an illustrative example.

Figure 1:
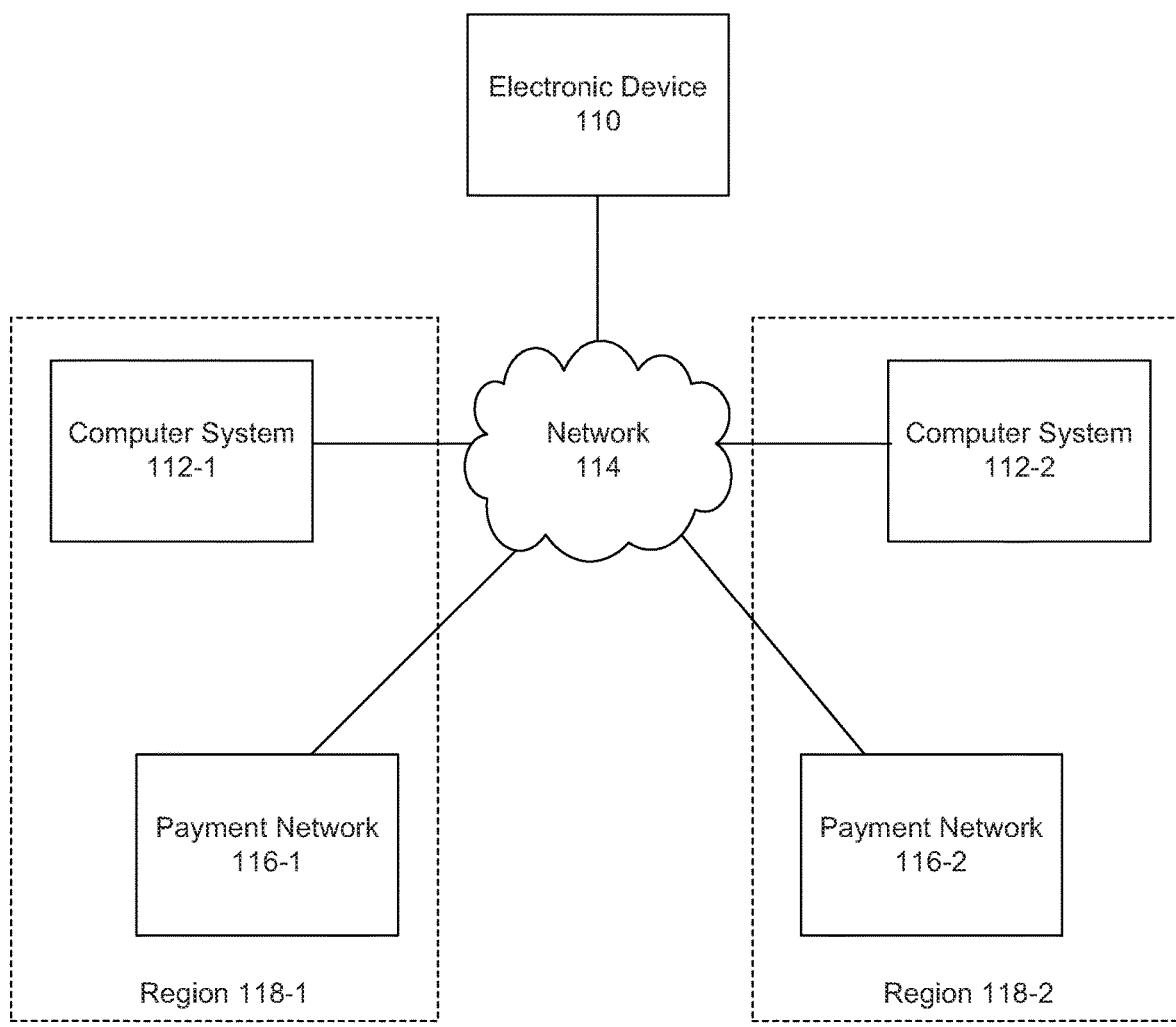
FIG. 1 is a block diagram that illustrates a system, according to example embodiments of the disclosure.

Communication between the electronic device and the updating device is shown in FIG. 1, which presents a block diagram illustrating an example of communication among electronic device 110 and computers 112 (such as servers or computer systems). As described further below with reference to FIGS. 3-7, these devices may communicate when one or more of computers 112 provision a payment instrument (such as a debit card or a credit card that is associated with an applet or an application that is executed in an environment of electronic device 110, e.g., in a secure element in electronic device 110) so that a user of electronic device 110 can use the provisioned payment instrument (via the applet or application on electronic device 110) to conduct transactions. Note that while the examples are presented with respect to payment instruments, other forms of credentials (such as prepaid cards, club cards, membership cards, reward cards, loyalty cards, transit passes, or any other such instrument) may be used in place of or in addition to payment instruments.

In order to avoid issues, e.g., potential latency issues, and/or to comply with government regulations in different regions or countries, provisioned payment instruments may be associated with different regions (e.g., it may be possible to provision a given payment instrument only in an associated region). In some implementations, the user is able to conduct transactions using a given payment instrument only in an associated region (such as the United States or Europe). In other implementations, a payment instrument is associated with one region, but is available for payment transactions in multiple regions. In either case, different computers 112-1 and 112-2 are used to service the provisioned payment instruments associated with the different regions, region 118-1 and region 118-2, as shown in FIG. 1.

A user who has registered with a system that facilitates provisioning of payment instruments via one of computers 112 (which are associated with or operated on behalf of a provider of the system), and has already provisioned a payment instrument associated with a particular region, may be assigned by default to a computer associated with that region. For example, the user may have registered using computer 112-1 (which can be implemented using one or more computing devices), and may have provisioned a credit card associated with a payment applet on electronic device 110 that is associated with the United States (e.g., region 118-1). As described further below, computer 112-1 may, therefore, become a default contact point for the user's account and may be the default computer in the event the user subsequently attempts to provision a second payment instrument. However, it may not be possible to complete a subsequent provisioning attempt if the financial information associated with the second payment instrument is required, e.g., by regulation, policy, rule, etc., to be stored (or homed) on computer 112-2 (which can be implemented using one or more computing devices), which is located in region 118-2 (e.g., in China) that is different from computer 112-1. Furthermore, it may not be required, but it may be advantageous, e.g., from a latency, balancing, or other performance perspective, to store information associated with the second payment instrument on computer 112-2.

In order to address this issue, when computer 112-1 receives, at a location (such as a uniform resource locator or URL) in network 114, a message from electronic device 110 with information specifying the unprovisioned payment instrument (e.g., the other credit card in the preceding example), computer 112-1 may determine that the unprovisioned payment instrument is associated with different region, region 118-2 (e.g., China in the preceding example) than region 118-1 (e.g., the United States in the preceding example) that is associated with computer 112-1 and the provisioned payment instrument. Consequently, computer 112-1 may provide, via network 114, redirect information to electronic device 110 that specifies computer 112-2 at another location (such as another URL). For example, the redirect information may include: a redirect having Hypertext Transfer Protocol (HTTP) status code 301, status code 307, and/or status code 308.

In response to receiving the redirect information, electronic device 110 may transmit, via network 114, the message to computer 112-2. Electronic device 110 and computer 112-2 may communicate, via network 114, provisioning information between electronic device 110 and computer 112-2, so that the unprovisioned payment instrument is provisioned to become a provisioned payment instrument that the user can use (e.g., via the same or another payment applet executed in the environment in electronic device 110) to conduct transactions. Note that computer 112-1 may store financial information associated with the provisioned payment instrument, e.g., a credit card, associated with the United States. Moreover, during or after the provisioning of the other payment instrument, e.g., the other credit card, is provisioned, computer 112-2 may store financial information associated with the provisioned payment instrument. In some embodiments, prior to receiving the message or communicating the provisioning information, computer 112-2 can register the user in China. Alternatively, another computer (such as one associated with a payment-network operator) may register the user.

In these ways, electronic device 110 and computers 112 may facilitate provisioning of payment instruments associated with different regions.

As noted previously, the communication between electronic device 110 and/or computers 112-1 and 112-2 may involve the exchange of packets that include any or all of payment instrument information, redirect information, registration information and/or provisioning information. These packets may be included in frames transmitted in one or more wireless channels.

As described further below with reference to FIG. 2, electronic device 110 and/or computers 112 may include subsystems, such as any or all of: a networking subsystem, a memory subsystem, a processing subsystem and a secure subsystem. In addition, electronic device 110 and/or computers 112 may include radios 114 in the networking subsystems. More generally, electronic device 110 and/or computers 112 can include (or can be included within) any electronic devices with networking subsystems that enable electronic device 110 and/or computers 112 to wirelessly communicate with another electronic device. This can comprise transmitting frames on wireless channels to enable electronic devices to make initial contact, followed by exchanging subsequent data/management frames (such as connect requests to establish a connection), configuring security options (e.g., IP SEC), transmitting and receiving packets or frames, etc. Furthermore, computers 112 may also include wired interfaces supporting one or more wired technologies, which enable them to communicate over network 114.

In FIG. 1, during communication via network 114, wireless signals may transmitted from/received by one or more radios in electronic device 110. These wireless signals may be received by/transmitted from radios in one or more of computers 112. However, the communication via network 114 between electronic device 110 and one or more of computers 112 may also be wired communication with a different communication protocol than the wireless communication. Moreover, the wireless communication may or may not involve a connection being established between electronic device 110 and/or computers 112, and therefore may or may not involve communication via a wireless network (such as a cellular-telephone network).

In some embodiments, processing a packet or frame in electronic device 110 and/or computer 112 includes: receiving wireless or wired signals with the packet or frame; decoding/extracting the packet or frame from received signals to acquire the packet or frame; and processing the packet or frame to determine information contained in the packet or frame (such as at least a portion of the update package).

In some embodiments, communication between electronic device 110 and computers 112 may be encrypted. For example, the information in the message may be encrypted. This encryption may use an encryption key (such as an encryption key associated with an applet and/or a vendor of the secure element). Furthermore, the encryption may use symmetric and/or asymmetric encryption techniques. Thus, a given payload may be encrypted with both a symmetric key and an asymmetric key (e.g., the symmetric key may be encrypted using the asymmetric key, and another part of the payload may be encrypted using the symmetric key).

Although we describe the environment shown in FIG. 1 as an example, in alternative embodiments, different numbers or types of electronic devices may be present. For example, some embodiments comprise more or fewer electronic devices.

Figure 2:
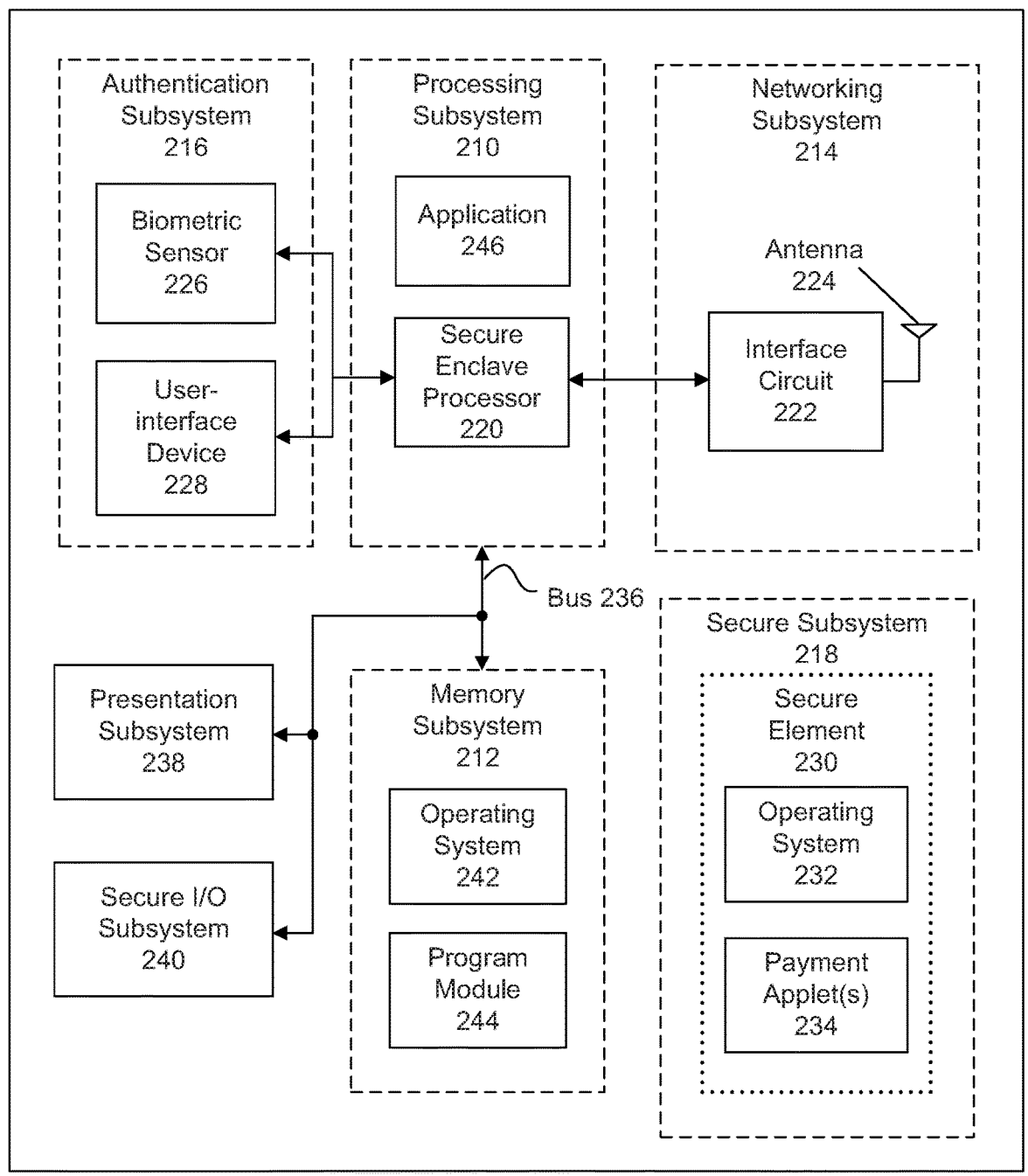
FIG. 2 is a block diagram that illustrates details of a system, according to example embodiments of the disclosure.

FIG. 2 presents a block diagram illustrating an example of electronic device 200, which may be electronic device 110 or one of computers 112 in FIG. 1. Electronic device 200 may include processing subsystem 210, memory subsystem 212, networking subsystem 214, authentication subsystem 216 and optional secure subsystem 218. Processing subsystem 210 includes one or more devices configured to perform computational operations. For example, processing subsystem 210 can include one or more microprocessors, application-specific integrated circuits (ASICs), microcontrollers, programmable-logic devices, and/or one or more digital signal processors (DSPs).

In addition, processing subsystem 210 may include an optional secure enclave processor 220 (e.g., implemented as a system-on-chip within one or more processors in processing subsystem 210) that performs security services for other components in the processing subsystem 210 and that securely communicates with other subsystems in electronic device 200. Secure enclave processor 220 may include one or more processors, a secure boot ROM, one or more security peripherals, and/or other components. The security peripherals may be hardware configured to assist in the secure services performed by secure enclave processor 220. For example, the security peripherals may include: authentication hardware implementing various authentication techniques (including biometric authentication), encryption hardware configured to perform encryption, secure-interface controllers configured to communicate over the secure interface to other components, and/or other components. In some embodiments, instructions executable by secure enclave processor 220 are stored in a trust zone in memory subsystem 212 that is assigned to secure enclave processor 220, and secure enclave processor 220 fetches the instructions from the trust zone for execution. Secure enclave processor 220 may be isolated from the rest of processing subsystem 210 except for a controlled interface, thus forming a secure enclave for secure enclave processor 220 and its components. Because the interface to secure enclave processor 220 is controlled, direct access to components within secure enclave processor 220 (such as a processor or a secure boot ROM) may be prevented. In some embodiments, secure enclave processor 220 encrypts and/or decrypts authentication information communicated with authentication subsystem 216, and encrypts and/or decrypts information (such as tokens) communicated with secure subsystem 218. Furthermore, secure enclave processor 220 may compare authentication information with stored authentication and, if a match is obtained, may provide an encrypted token with an authentication-complete indicator to a secure element 230 and/or may assert the authentication-complete indicator as a flag in operating system 242.

Memory subsystem 212 includes one or more devices for storing data and/or instructions for processing subsystem 210, networking subsystem 214, authentication subsystem 216 and/or secure subsystem 218. For example, memory subsystem 212 can include dynamic random access memory (DRAM), static random access memory (SRAM), and/or other types of memory. In some embodiments, instructions for processing subsystem 210 in memory subsystem 212 include: one or more program modules or sets of instructions (such as program module 244, e.g., a digital wallet, a passbook and/or a mobile payments application), which may be executed by processing subsystem 210. Note that the one or more computer programs may constitute a computer-program mechanism or a program module. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in electronic device 200. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 200 as fast-access storage for often-used data, while the mass-storage device is used to store less frequently used data.

Networking subsystem 214 includes one or more devices configured to couple to and communicate on a wired and/or wireless network (i.e., to perform network operations), including an interface circuit 222 (such as a near-field-communication circuit) and an optional antenna 224. For example, networking subsystem 214 can include one or more of a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, a near field communications (NFC) system, and/or any other communication system.

Networking subsystem 214 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 200 may use the mechanisms in networking subsystem 214 for performing simple wireless communication between electronic device 200 and computers 112 (FIG. 1), e.g., transmitting advertising frames, request messages, beacons, pages, or other such device-to-device/peer-to-peer communications.

Authentication subsystem 216 may include one or more processors, controllers and devices for receiving the authentication information from a user of electronic device 200, and for securely communicating this authentication information to processing subsystem 210 (such as by encrypting the authentication information). For example, the authentication information may include any or all of: a biometric identifier acquired by a biometric sensor 226 (such as: a fingerprint sensor, a retinal sensor, a palm sensor, a digital signature-identification sensor, etc.); a personal identification number (PIN) associated with one of payment applets 234 that is received using an optional user-interface device 228 (such as a keypad, a touch-sensitive display, optical character recognition and/or voice recognition); and a passcode for unlocking at least some functionality of electronic device 200 that is received using user-interface device 228.

Furthermore, secure subsystem 218 may include a secure element 230, which includes one or more processors and memory. Note that secure element 230 may be a tamper-resistant component that is used in electronic device 200 to provide the security, confidentiality, and multiple application environments required to support various business models. Secure element 230 may exist in one or more of a variety of form factors, such as: a universal integrated circuit card (UICC), an embedded secure element (on a circuit board in electronic device 200), a smart secure digital (SD) card, a smart microSD card, etc.

Moreover, secure element 230 may include one or more applets or applications that execute in an environment of secure element 230 (such as in operating system 232 of secure element 230, and/or in a Java runtime environment executing on the secure element 230). For example, the one or more applets may include an authentication applet that performs contactless registry services, encrypts/decrypts packets or tokens communicated with secure enclave processor 220, sets one or more software flags (such as an authentication-complete flag) in operating system 232 of secure element 230, and/or conveys information to one or more payment applets 234. The one or more applets may include one or more payment applets 234 that are used to conduct transactions with another electronic device when they are activated by program module 244, based on the one or more software flags and/or when electronic device 200 is proximate to the other electronic device. In particular, payment applets 234 may each be associated with a financial vehicle or a payment instrument (such as a credit card, a debit card, a prepaid debit card, a gift card, a rewards card, another type of payment card and, more generally, a credential provided by a financial institution or merchant, e.g., a bank, that is associated with an account of a user, such as a user of electronic device 200). Furthermore, in some implementations, an associated region can be identified where a given payment applet can be used to conduct transactions. In addition, secure element 230 may include information associated with the one or more payment applets 234 (such as a device primary account number (DPAN), a personal identification number (PIN), a debit-card number, and/or one or more encryption keys) that is used when conducting the transactions. (Note that the DPAN may be associated with, but different than, a financial primary account number or FPAN for the financial account, such as a credit-card number. The DPAN may be a virtual identifier for the FPAN that may be generated by a payment network or locally by the device.)

The authentication applet may execute in a master or issuer security domain in secure element 230 (such as controlling authority security domain), while payment applets 234 may execute in supplemental security domains. Communication between these security domains may be encrypted using different encryption/decryption keys that are security-domain specific. In electronic device 200 and/or during communication between electronic device 200 and computers 112 (FIG. 1), encryption/decryption may involve symmetric and/or asymmetric encryption. In addition, the information communicated may also include a digital signature that is specific to electronic device 200 and/or components in electronic device 200, such as secure element 230 or one of payment applets 234.

During operation of electronic device 200, the user may use application 246 to select or activate one or more of payment applets 234. If the payment applet supports an authentication-complete flag (as indicated by the enabling or setting of authentication support in the payment applet), in order for the payment applet to conduct a transaction with another electronic device, the payment applet may need to be activated and the authentication-complete flag may need to be set or enabled in secure element 230 (indicating that the user has been authenticated). In contrast, for one of payment applets 234 that does not support the authentication-complete flag, a transaction may be conducted when this payment applet is active (i.e., operation of the payment applet is not gated by the setting or enabling of the authentication-complete flag in secure element 230). While the present discussion illustrates the use of a global authentication-complete flag, note that in some embodiments separate authentication-complete flags are associated with at least some of payment applets 234 (i.e., there may be a specific authentication-complete flag for a given payment applet, etc.).

When electronic device 200 is proximate to the other electronic device (such as a point-of-sale terminal) or when secure enclave processor 220 provides a payment command to secure element 230, one of the specified, activated and/or authenticated payment applets 234 may provide one or more payment packets (which may be encrypted or unencrypted) to interface circuit 222 or to secure enclave processor 220 (which then provides the payment packet(s) to interface circuit 222). Then, interface circuit 222 may communicate the payment packet(s) to the other electronic device (such as a point-of-sale terminal) using antenna 224. Note that the payment packet(s) may include financial information (such as a financial credential or a DPAN associated with the one of the payment applets 234).

This financial information (as well as additional information provided by the other electronic device, such as a merchant identifier, an amount of the transaction, etc.) may be communicated by the other electronic device to a payment network 116 (FIG. 1) to complete a transaction. Once the transaction is complete, a notification from a management electronic device (e.g., a server or a base station which may be associated with a provider of electronic device 200) may be received by interface circuit 222. Application 246 may provide the notification to presentation subsystem 238 for presenting the notification (e.g., through one or more of a display, audible sounds, and/or haptic stimulation), so the user of electronic device 200 can be alerted that the transaction was successfully completed.

As noted previously, in order to use one or more of payment applets 234 to conduct transactions in associated regions, the one or more payment applets 234 (and, more generally, the one or more associated payment instruments or credentials) may need to be provisioned. During the provisioning technique secure enclave processor 220 may receive, from the user, information specifying an unprovisioned payment instrument (or credential), and the information may be securely communicated to secure element 230. For example, the information may be entered by the user using user-interface device 228 (such as a keyboard or microphone) and/or may be acquired using an imaging sensor or NFC device included in electronic device 200. Therefore, the information may include: an image (such as photograph) of the unprovisioned payment instrument; and/or a numerical identifier associated with the unprovisioned payment instrument (such as the FPAN).

Operating system 232 (or a program module executed by a processor in secure element 230 in an environment of operating system 232) may generate a message based on the information, which is communicated to computer 112-1 (FIG. 1) using interface circuit 222. For example, operating system 232 may encrypt the information in the message using an encryption key associated with one of payment applets 234.

Moreover, interface circuit 222 may receive the redirect information from computer 112-1 in region 118-1 (FIG. 1), where the redirect information specifies computer 112-2 (FIG. 1) associated with a second region, region 118-2, in which information associated with the unprovisioned payment instrument is to be maintained. This redirect information may be securely communicated to operating system 232. Furthermore, operating system 232 may instruct interface circuit 222 to provide the message to computer 112-2 (FIG. 1) as indicated by the redirect information.

Interface circuit 222 can be used to communicate provisioning information between electronic device 200 and computer 112-2 (FIG. 2). This provisioning information may be used by operating system 232 to provision the unprovisioned payment instrument as an additional provisioned payment instrument. For example, operating system 232 may use the provisioning information to configure or enable one of payment applets 234.

In some embodiments, prior to providing the message to the computer 112-2 (FIG. 1), operating system 232 optionally exchanges, via interface circuit 222, registration information with another computer (such as a computer or a server associated with a payment-network operator) in order to register the user in the second region, region 118-2. Alternatively, computer 112-2 (FIG. 1) may optionally register the user in the second region, e.g., based on previous registration information from another region (e.g., copying registration from region 118-1).

Within electronic device 200, processing subsystem 210, memory subsystem 212, networking subsystem 214, authentication subsystem 216 and secure subsystem 218 may be coupled using one or more interconnects, such as bus 236. These interconnects may include an electrical, optical, and/or electro-optical connection that the subsystems can use to communicate commands and data among one another. Note that different embodiments can include a different number or configuration of electrical, optical, and/or electro-optical connections among the subsystems. In some embodiments, electronic device 200 can detect tampering with secure components (such as secure enclave processor 220, secure element 230 and/or bus 236) and may destroy encryption/ decryption keys or authentication information (such as a stored biometric identifier) if tampering is detected.

In some embodiments, electronic device 200 includes optional presentation subsystem 238 for presenting information using a sensory input (such as a notification of a successfully completed transaction), which may include a display driver and a display (such as a liquid-crystal display, a multi-touch touchscreen, etc.), one or more speakers and/or a haptic feedback device. In addition, in some embodiments electronic device 200 includes an optional secure input/output (I/O) subsystem 240 (such as a keypad) for receiving the PIN of the user that is associated with one of payment applets 234. As noted previously, presentation subsystem 238 and/or secure I/O subsystem 240 may be included in authentication subsystem 216.

Electronic device 200 can be (or can be included in) any electronic device with at least one network interface. For example, electronic device 200 can be (or can be included in): a desktop computer, a laptop computer, a server, a computer system (which may be at a particular location or may be geographically distributed), a media player (such as an MP3 player), an appliance, a subnotebook/netbook, a tablet computer, a smartphone, a cellular telephone, a wearable computing device, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 200, in alternative embodiments, different components and/or subsystems may be present in electronic device 200. For example, electronic device 200 may include one or more additional processing subsystems, memory subsystems, networking subsystems, authentication subsystems, secure subsystems, presentation subsystems and/or secure I/O subsystems. Additionally, one or more of the subsystems may not be present in electronic device 200. Moreover, in some embodiments, electronic device 200 may include one or more additional subsystems that are not shown in FIG. 2. For example, electronic device 200 can include, but is not limited to, a data collection subsystem, an audio and/or video subsystem, an alarm subsystem, and/or a media processing subsystem. Also, although separate subsystems are shown in FIG. 2, in some embodiments, some or all of a given subsystem or component can be integrated into one or more of the other subsystems or components in electronic device 200. For example, in some embodiments program module 244 is included in operating system 242. Alternatively or additionally, at least some of the functionality of program module 244 may be included in application 246.

Moreover, the circuits and components in electronic device 200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 214 (such as a radio) and, more generally, some or all of the functionality of electronic device 200. Moreover, the integrated circuit may include hardware and/or software mechanisms that are used for transmitting wireless signals from electronic device 200 to, and receiving signals at electronic device 200 from computers 112 (FIG. 1). Aside from the mechanisms herein described, radios are generally known in the art and hence are not described in detail. In general, networking subsystem 214 and/or the integrated circuit can include any number of radios.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with a cellular telephone network was used as an illustrative example, the described embodiments of the provisioning technique may be used in a variety of network or communication interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

Moreover, while the preceding discussion focused on the hardware, software and functionality in electronic device 200, computers 112 (FIG. 1) may have the same or similar hardware (processors, memory, networking interfaces, etc.) and/or software to support the operations performed by these entities, as described further below with reference to FIGS. 3-7. In particular, these entities may include one or more computers with a processing subsystem that executes one or more program modules stored in a memory subsystem to perform the operations, and one or more networking interfaces for communicating with other electronic devices, such as electronic device 200.

Figure 3:
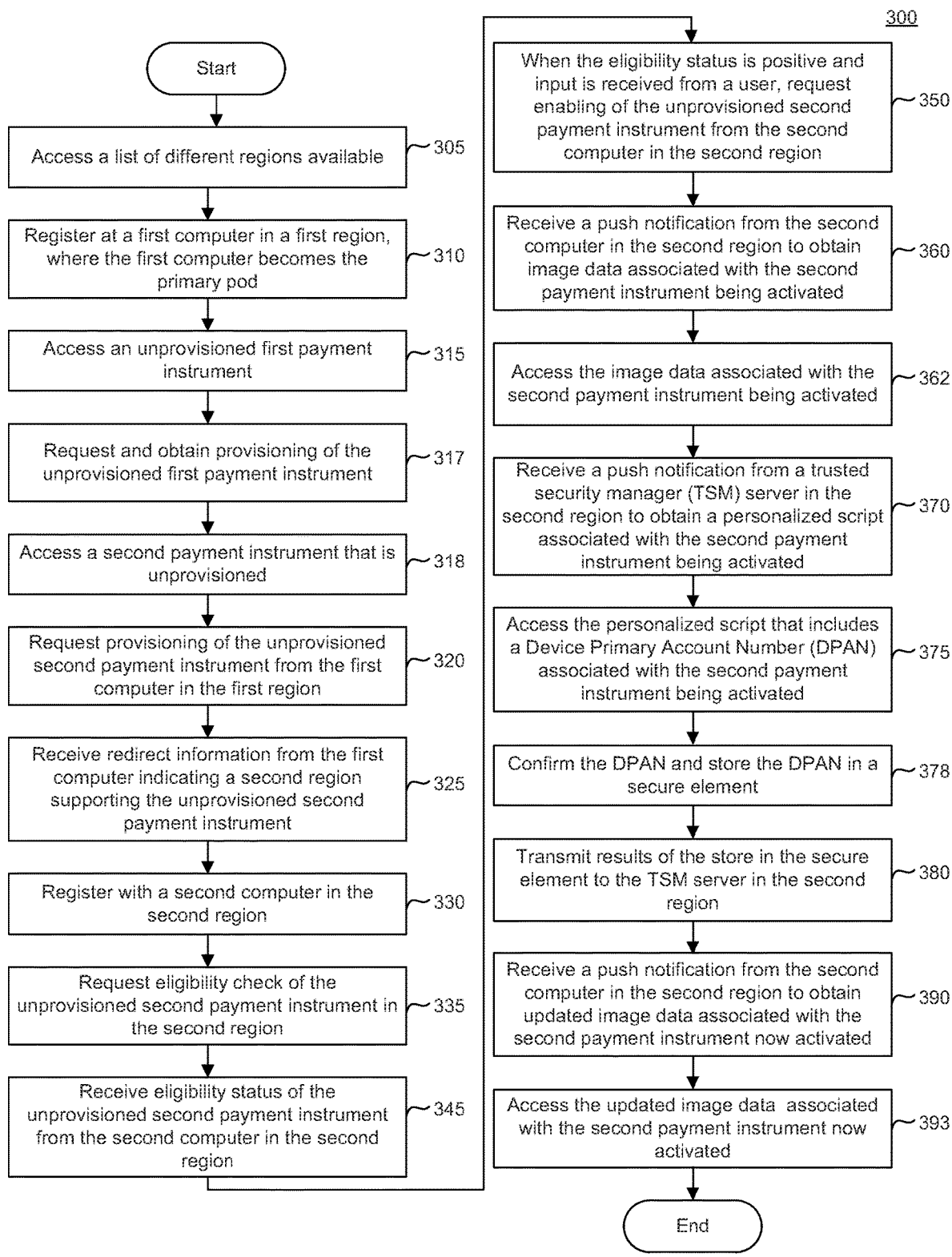
FIG. 3 illustrates an example method for an electronic device for provisioning a payment instrument in different regions.

We now further describe provisioning a payment instrument (such as a payment applet) for use with the electronic device, according to an embodiment. FIG. 3 presents a flow diagram illustrating an example of method 300 for provisioning an unprovisioned payment instrument in different regions, which may be performed using an electronic device (such as electronic device 110 in FIG. 1). In particular, method 300 may be performed using one or more processors, an interface circuit, and/or a processor in the secure element in the electronic device (which executes a program module). As a convenience, and not a limitation, method 300 may be described using elements of FIGS. 1 and 2.

Method 300 begins at step 305 where electronic device 110 may access a list of different regions that are supported, or are available for registration.

At step 310, electronic device 110 may register at a computer system in a region. In some embodiments, when the electronic device 110 registers for the first time, for example with a first computer system 112-1 (e.g., a set of servers) located in region 1 (R1), computer system 112-1 is considered the primary pod (or primary registration system). In other embodiments, electronic device 110 may register with a first computer 112-1 in a first region (e.g., R1) yet be associated with a primary pod in a different region (e.g., R2).

At step 315, electronic device 110 receives information specifying an unprovisioned payment instrument or credential. For example, the information may include: an image (such as photograph) of the unprovisioned payment instrument; and/or a numerical identifier associated with the unprovisioned payment instrument (such as the FPAN). In other embodiments, other or additional identifiers can be used to identify the payment instrument to be provisioned.

At step 317, electronic device 110 requests and obtains provisioning of the unprovisioned first payment instrument. The first payment instrument may be provisioned by exchanging information among electronic device 110, computer system 112-1, and trusted security manager (TSM) server associated with computer system 112-1, to become available for use in transactions.

At step 318, electronic device 110 may access information regarding an unprovisioned second payment instrument as described at step 315. For example, the user may enter a debit card number and/or pin via a graphical user interface (GUI) on a screen, or access payment instruments already being used by other applications already on electronic device 110.

At step 320, electronic device 110 provides a message based on the unprovisioned second payment instrument information to a first computer accessible at a first location in a network (such as a first URL), where the first computer is associated with a first region in which the user has registered. As described at step 317, first computer may already support a first provisioned payment instrument associated with user, which the user can use to conduct, via the electronic device and/or another electronic device, transactions. Note that the message may include an encrypted version of some or all of the unprovisioned second payment instrument information. In addition, each of the first provisioned payment instrument and the second provisioned payment instrument may represent a debit card or a credit card. For example, electronic device 110 requests provisioning of the second payment instrument from a first computer in the first region (e.g., computer system 112-1). Computer system 112-1 may determine that the second payment instrument is not supported in region 1. For example, payment network 116-1 in region 1 may not support a credit card issued by an issuer associated with payment network 116-2 in region 2.

At step 325, electronic device 110 may receive redirect information from the first computer (e.g., computer system 112-1), where the redirect information specifies a second computer (e.g., computer system 112-2) accessible at a second location in the network (such as a second URL), and the second computer is associated with a second region in which the unprovisioned payment instrument is supported. For example, the redirect information may include: a redirect having Hypertext Transfer Protocol (HTTP) status code 301, a redirect having HTTP status code 307, and/or a redirect having HTTP status code 308.

At step 330, electronic device 110 may register with the second computer in the second region (e.g., computer system 112-2). At step 335, electronic device 110 may request an eligibility check of the unprovisioned second payment instrument in the second region. For example, computer system 112-2 may communicate with payment network operator for R2 (PNO-R2) to determine whether the second payment type satisfies certain requirements. For example, is the second payment type active, in good standing, etc.

At step 345, electronic device 110 receives the eligibility status of the unprovisioned second payment instrument from computer system 112-2.

At step 350, when the eligibility status is positive and input from the user is received requesting provisioning of the second payment instrument, electronic device 110 requests enabling of the unprovisioned second payment instrument. The request is transmitted to the second computer in the second region, computer system 112-2. Computer system 112-2 generates and saves image data associated with the second payment instrument that may include text and visuals that the user has entered and/or captured.

At step 360, electronic device 110 receives a push notification from the second computer in the second region (e.g., computer system 112-2) to obtain the image data associated with the second payment instrument being activated.

At step 362, electronic device 110 accesses the image data associated with the second payment instrument being activated. For example, the image data may include a notice for the user (e.g., audible sound, or animation) indicating that the second payment instrument is undergoing activation.

At step 370, electronic device 110 receives a push notification from a trusted security manager (TSM) server in the second region (e.g., TSM-R2-P1) to obtain a personalized script associated with the second payment instrument being activated.

At step 375, electronic device 110 accesses the personalized script from the TSM server in the second region (e.g., TSM-R2-P1) that includes a Device Primary Account Number (DPAN) associated with the second payment instrument being activated.

At step 378, electronic device 110 confirms the DPAN and stores the DPAN in secure element 230. The store may be successful or, e.g., if an error has occurred, the store may be unsuccessful.

At step 380, electronic device 110 transmits results of storing the DPAN in secure element 230 to the TSM server in the second region (e.g., TSM-R2-P1).

At step 390, electronic device 110 receives a push notification from the second computer in the second region to obtain updated image data associated with the second payment instrument now activated.

At step 393, electronic device 110 accesses the updated image data associated with the second payment instrument now activated.

Once the second payment instrument is provisioned to become a second provisioned payment instrument, where the user can conduct, via the electronic device and/or another electronic device (i.e., the transactions may be conducted using the same or a different electronic device than the one used during the provisioning of the payment instrument), transactions based on the second provisioned payment instrument. Transactions based on the second provisioned payment instrument may or may not be limited to the second region. Once provisioned, the first and second payment instruments can be represented on the electronic device without reference to the region with which they are associated. For example, the first and second payment instruments or credentials can be presented in the same application, e.g., a passbook or an e-wallet application, in a manner that provides a unified view/experience. The presentation of the first and second payment instruments or credentials further can be done such that it is not evident that the payment instruments are stored on or otherwise associated with different regions.

Alternatively, the manner in which a payment instrument is represented on the electronic device can be informed by the region with which the payment instrument is associated. For example, a payment instrument may only be shown or otherwise indicated as active or available if the electronic device is in a region in which the payment instrument can be used to conduct a transaction. Further, a user may be permitted to elect how to present provisioned payment instruments or credentials, e.g., within an application. As a result, an application can be configured to present payment instruments or credentials in a unified manner or a separated manner, e.g., based on user input.

In some embodiments, the user is optionally registered in the second region via the electronic device by exchanging registration information with a third computer (operation 316), such as a third computer associated with a payment-network operation (e.g., a credit-card provider).

Note that the first computer may store financial information associated with the first provisioned payment instrument. After the unprovisioned payment instrument is provisioned to become the second provisioned payment instrument, the second computer may store second financial information associated with the second provisioned payment instrument based on regulations associated with the second region. In this way, there may not be any overlap in the financial information stored in the first computer and the second computer.

Figure 4:
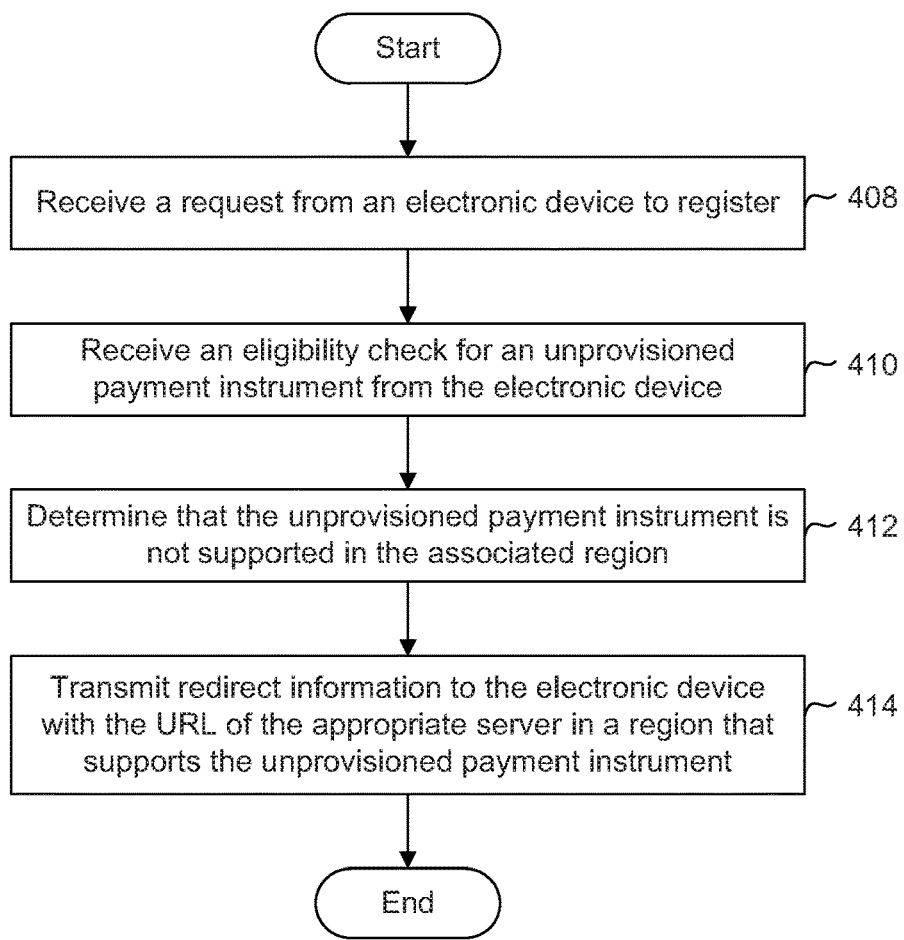
FIG. 4 illustrates an example method for a computer system for provisioning an unprovisioned payment instrument in a different region.

The corresponding operations performed by the first computer and/or the second computer (which may be included in a computer system associated with or operated on behalf of a provider of the provisioning technique and/or the electronic device) are shown in FIG. 4, which presents a flow diagram illustrating an example of method 400 for provisioning an unprovisioned payment instrument in the system of FIG. 1. In particular, method 400 may be performed by one or more interface circuits and processors (which execute one or more program modules) in the first computer and/or the second computer. As a convenience, and not a limitation, method 400 may be described using elements of FIGS. 1 and 2.

Method 400 begins at step 408, where computer system 112-1 may receive a request from electronic device 110 to register, e.g., create a new account for a user/device in the region.

At step 410, computer system 112-1 receives the message from the electronic device that includes the information specifying the unprovisioned payment instrument, including information to be used in evaluating eligibility for registration.

At step 412, computer system 112-1 determines that the unprovisioned payment instrument is associated with or supported in the second region that differs from the first region associated with computer 112-1, where the user is registered in the first region. In some embodiments, method 400 also may be invoked when the user attempts to provision a payment instrument associated with the second region.

At step 414, the computer system 112-1 provides the redirect information to electronic device 110, where the redirect information specifies computer system 112-2, a second computer system accessible at the second location in the network, and where the second computer system is associated with the second region in which the unprovisioned payment instrument is supported.

Alternatively, the second computer may receive the message from the first computer. Then, the second computer may communicate the provisioning information between the electronic device and the second computer so that the unprovisioned payment instrument is provisioned to become the second provisioned payment instrument, where the user can conduct, via the electronic device and/or the other electronic device, the transactions based on the second provisioned payment instrument, e.g., in at least the second region.

Figure 5:
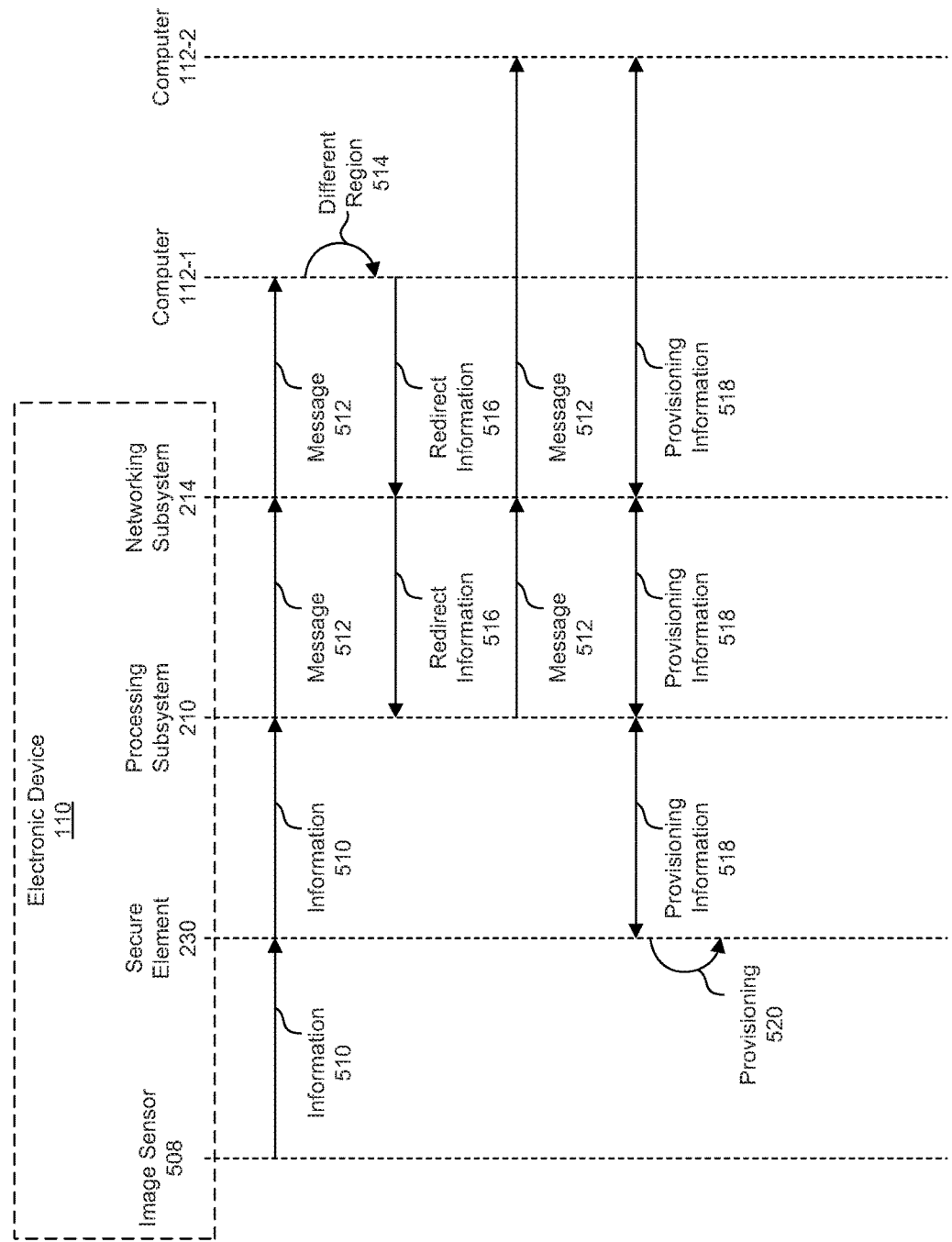
FIG. 5 illustrates communication among an electronic device and computer systems, according to example embodiments of the disclosure.

The communication among electronic device 110 and computers 112 during methods 300 and 400 (FIGS. 3 and 4) is shown in FIG. 5, according to some embodiments. In particular, secure enclave processor 220 in FIG. 2 (and, more generally, processing subsystem 210) may receive information 510 specifying the unprovisioned payment instrument, e.g., when the user takes a picture including a numerical identifier (such as the FPAN) of the unprovisioned payment instrument using imaging sensor 508 or otherwise enters information identifying the unprovisioned payment instrument. Then, processing subsystem 210 may instruct networking subsystem 214 to provide message 512 that includes information 510 to computer 112-1. Computer 112-1 may determine that the unprovisioned payment instrument is associated with a different region 514 than a region associated with and supported by computer 112-1. Consequently, computer 112-1 may provide redirect information 516 to electronic device 110. Alternatively, in some embodiments, computer 112-1 may redirect the message 512 to computer 112-2 directly.

Networking subsystem 214 may receive redirect information 516, and may forward redirect information 516 to processing subsystem 210. In response to redirect information 516, processing subsystem 210 may instruct networking subsystem 214 to provide message 512 with information 510 to computer 112-2, associated with the region in which the unprovisioned payment instrument is supported. Next, electronic device 110 and computer 112-2 may communicate provisioning information 518 with each other in order for secure element 230 to provision 520 the unprovisioned payment instrument.

In some embodiments of methods 300 (FIG. 3) and 400 (FIG. 4), there may be additional or fewer operations. Furthermore, the order of the operations may be changed, and/or two or more operations may be combined into a single operation. For example, the operations in methods 300 (FIG. 3) may be performed by a different processor in the electronic device, such as a secure enclave processor. Alternatively or additionally, the first computer may forward the message to the second computer along with a location (such as an address) that the second computer can use to communicate with the first computer and/or the electronic device. In such embodiments, the electronic device does not need to provide the message to the second computer.

In an exemplary embodiment, the provisioning technique allows the user to so-called 'multi-home' financial data or information associated with payment instruments that can be used to conduct transactions in different regions. This multi-homing capability allows the user to have a consolidated view of their payment information (e.g., the payment information associated with different countries) on their electronic device (such as their cellular telephone), while the financial data for different payment instruments associated with different regions (such as different regions or countries) is housed on computers in physically and logically separate locations (which correspond to the different regions).

In existing payment systems, a registered user may have an affinity with one pod. A pod may include a set of one or more servers located in one region that serves a registered user. As a result of certain circumstances, e.g., policies, rules, regulations, etc. (which may require that financial data for payment instruments associated with a particular country only be stored on computers in that country) and/or potential latency issues, a user may need to be registered in more than one region—and thus with more than one pod. Note that a region may include a set of pods, e.g., such as pods that are in close spatial locality or proximity with one another (such as adjacent portions of a country). For example, a region may include four pods. (This is an illustrative example and is not intended to be limiting. In general, a region may include fewer than or more than four pods.) However, in the described provisioning technique, a user can be registered in more than one region. This may necessitate additional capabilities on the electronic device and the computers associated with the regions. These capabilities may allow a user to provision, in a unified account (and/or application view), payment instruments whose financial data resides in multiple, separate computers in the system that are associated with different regions, while providing a consistent and complete view of multiple payment instruments, passes and credentials of the user on the electronic device. In some embodiments, these computers reside in the separate regions. For example, a user account can have one or more payment instruments, passes and/or credentials associated with a first pod in a first region and one or more different payment instruments, passes and/or credentials associated with a second pod in a second region. Nonetheless, some or all of the payment instruments, passes and/or credentials associated with the first and second pods can be represented as a unified collection, e.g., on the electronic device.

One issue is storing financial or payment-instrument data for the same user in multiple regions. In order to solve this issue, additional awareness and intelligence may be needed in the electronic device and/or the computers in the system. In general, implementing the functionality at the computer level may allow the computers to: scale well, decrease the latency incurred by cross-regional communication and/or minimize complexity. Moreover, the majority of the application programming interface (API) calls to the system used during the provisioning technique may remain unchanged. Client-side views (e.g., views on the electronic device), which may require an aggregate view of the multiple payment instruments of a user, may obtain payment instrument (or credential) data from the multiple regions (and, in particular, the computers in the system) and display or present them as a single dataset.

In some embodiments, the payment-instrument data for the different regions is compatible across regions. Region A may be compatible with region B, if all the payment instruments that can be added in region A can be added in region B, and vice versa. For example, the U.S. and Europe may be compatible regions if the same credit cards can be added in Europe as the U.S., and vice versa. In this example, separate regions may be used to improve system performance, e.g., in order to decrease latency associated with calls from an electronic device in Europe to a pod in the U.S., to provide for load balancing, and/or to improve transaction time when a pod is involved, e.g., for provisioning and/or certain transactions. (While transactions may not be processed using the computers in the system, and thus the latency during transactions may not be impacted by their location, in-application purchases may be processed using the computers in the system, and thus the latency during in-application purchases may be improved by multi-homing.)

However, in the provisioning technique, there may be some changes to the APIs accessible via the computers in the system. In particular, the list of regions API (which provides a small configuration file called the plist) and the registration API may need to be updated. In general, a user may be allowed to register when any of the following conditions are met: the electronic device is already registered on the present pod; the electronic device is not registered anywhere; the electronic device is registered in other regions and all the registered regions are not compatible with the present region; and/or the electronic device is owned by a new user (in this case, the user may first unregister everywhere else).

Moreover, the response-body API from one of the computers may be encapsulated in a larger data structure. This data structure may inform the electronic device of all the regions where the user is registered, such as: region1: {register response body}, region2: {register response body}, . . . , and regionN: {register response body}.

Furthermore, the check-card API may be used to conditionally point the electronic device to a different region (e.g., to provide the redirect information). A call to the new (unprovisioned) card or payment instrument and the existing (provisioned) card or payment instrument check eligibility may check to see if the bank identification number (bin) range of the FPAN of the card to be provisioned (such as the first six numbers in the FPAN) is permitted on the region executing the code (i.e., the computer associated with the region). (More generally, an identifier associated with the payment instrument may be used to check the eligibility.) If the payment instrument is permitted, the computer may continue with the provisioning. However, if payment instrument is not permitted, and the user is registered in a different region where the unprovisioned card is allowed (i.e., where, once provisioned, the payment credential information can be stored), the computer may return a message indicating that the electronic device should attempt the provisioning on another pod (and, thus, on another computer in the system associated with the different region). Alternatively, if the user is not registered in the different region where the unprovisioned card is to be provisioned, the computer may return a message indicating that the electronic device should register in the other pod before attempting the provisioning.

Additionally, another API may be used to: create new certificates or topics for each region, as well as a global topic; send a push to the electronic device on a region-specific topic which may cause the electronic device to reach out to the registered pod in that region; and/or provide a global push topic which may cause the electronic device to reach out to all N of its regions.

Note that the computers in the system may be responsible for suspending, resuming, and/or unlinking the payment-instrument data on the regions for the electronic device. In addition, the electronic device may call a get-passes API for each of the regions in which the electronic device (i.e., the user) is registered, and may aggregate the results into a final view for the user.

The multi-homing described above introduces regions with a collection of pods. During the provisioning technique, a user may register into one of the pods in a region via the associated computer (or server) in the system. In response, a small configuration file (the plist) may be downloaded with entries for the supported regions, which may include information such as: China and a URL of the associated server, U.S. and another URL of another associated server, etc.

For an unprovisioned payment instrument or card associated with the current registered region (and, thus, the current server), such as the U.S., the electronic device may make a request to the appropriate URLs to start the registration process. Then, the electronic device may be provisioned with the payment instrument as usual.

However, if the user subsequently attempts to provision an new unprovisioned payment instrument or card that is only supported in a different region, e.g., China, while the present region is still the U.S., when the electronic device communicates with the server associated with the U.S., this server may decrypt information associated with the new payment instrument and (e.g., via the bin range in the FPAN) determine that the user is registered in U.S. and that the new payment instrument is only supported in a different region, e.g., China. Consequently, the server may send a redirect (such as an HTTP 301 response) identifying the support region, such as the URL for a pod in China.

Next, the user may register in the supported region, e.g., China, and the unregistered payment instrument can be provisioned, so that the financial data associated with the newly provisioned payment instrument is stored in a server in the supported region, e.g., China. Note that the provisioning information stored on the secure element in the electronic device may be limited (such as the DPAN), and the payment credentials (such as the FPAN) may not be transferred to the secure element. Instead, the state of the secure element may be conveyed between the electronic device and the server in, e.g., China (and, in particular, the state of a container for the associated payment applet in a security domain on the secure element). Sensitive provisioning information may be stored on the server associated with the region (such as China). This provisioning information may include: financial information, payment information, a URL for transactions, the cardholder name, the last four digits of the FPAN, the bank name, identifiers (such as the DPAN), etc.

While the financial data may be stored in a distributed manner on the servers in the system, all the pods may be able to communicate with each other so the region where the user is registered can be determined and so the user can see a unified picture of their provisioned cards on the electronic device.

Figure 6:
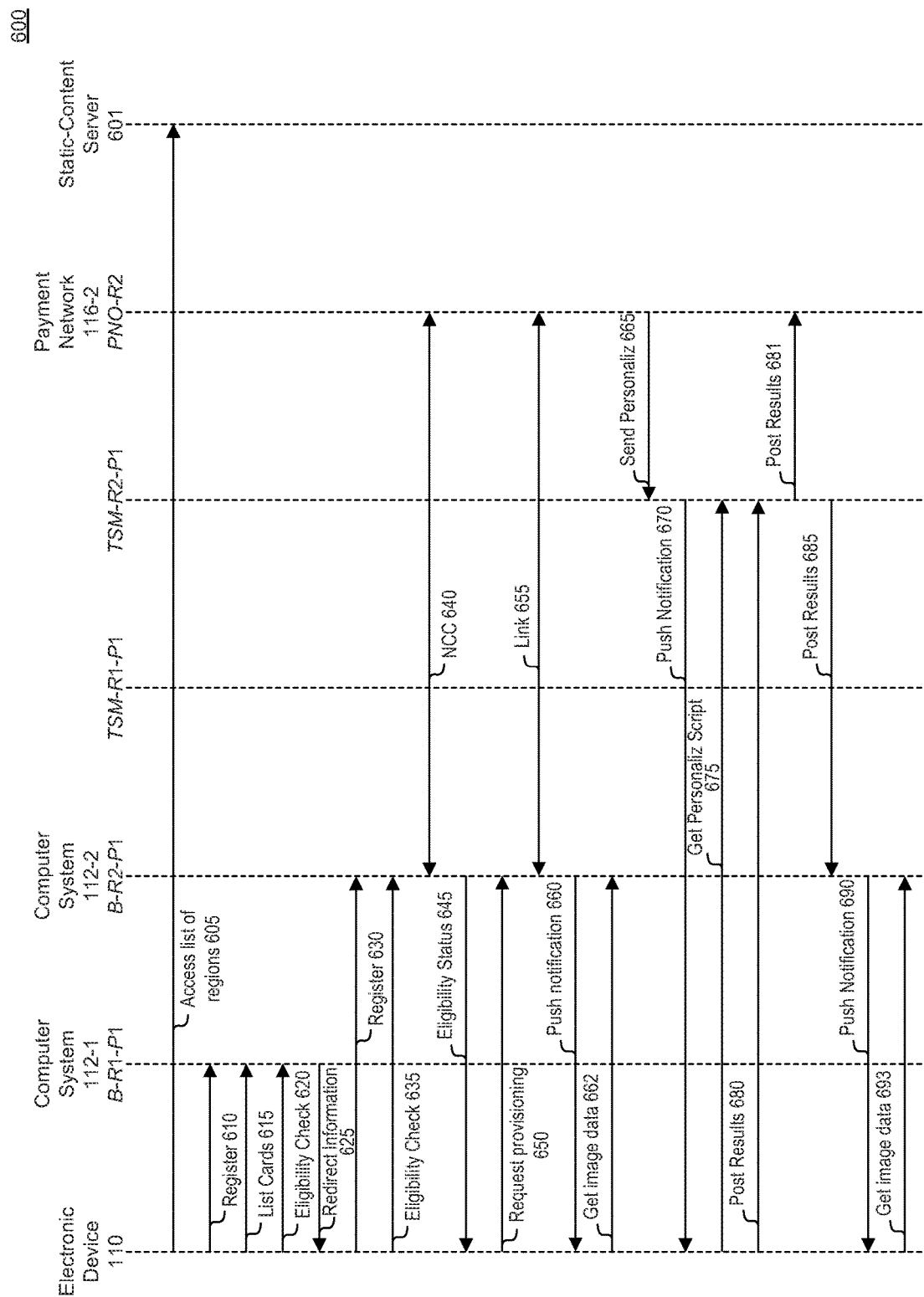
FIG. 6 illustrates provisioning a payment instrument in a different region, according to example embodiments of the disclosure.

An exemplary embodiment of provisioning of a new card is shown in FIG. 6, which presents a drawing illustrating communication among one of the electronic devices and the computers in FIG. 1. Flow 600 may be described using elements of FIGS. 1 and 2, in accordance with an example of the present disclosure. In particular, during the provisioning technique at step 605, electronic device 110 downloads an access list of different regions with which electronic device 110 may register. For example, electronic device 110 may download a configuration file (e.g., get plist) with the URLs of the servers associated with the regions. This configuration file may be provided by a static content distribution service 601 (such as a static-content server that may be hosted by a third party or a provider of the system).

At step 610, electronic device 110 registers in the pod (P1) based on the current region (R1). In order to do so, electronic device 110 may reach out to the URL for a server in the system, which is sometimes referred to as a broker server, (B-R1-P1).

After electronic device 110 registers, electronic device 110 may access one or more credit cards and/or debit cards input by a user to electronic device 110, or from an application on electronic device 110. For example, at step 615 electronic device 110 may provide a call for a list of cards to B-R1-P1.

Further, the user can attempt to provision a new card that cannot be provisioned in the current region, e.g., at step 620, electronic device 110 transmits an eligibility check request to B-R1-P1 of computer system 112-1. B-R1-P1 may determine, for example, that payment network 116-1 in R1 does not support the new card, and that the new card is supported in a different region, such as region 2 (R2).

At step 625, B-R1-P1 provides the redirect information with the URL of the appropriate server (e.g., B-R2-P1 of computer system 112-2), such as HTTP status code 301, 307 and/or 308.

If the user is not registered in the region associated with the new card (e.g., R2), the user may need to register electronic device 110 in this region as shown in step 630, before trying to provision the new card in the new region. However, in some embodiments the user attempts to provision the new card without registering in the new region.

At step 635, electronic device 110 may request an eligibility check for the new card to determine if the new card is may be provisioned in R2. In response at step 640, B-R2-P1 may initiate a new credit card (NCC) request to a server of the payment-network operator for region R2 (such as a Chinese credit-card company), which may be referred to as PNO-R2. PNO-R2 may determine and provide a positive or negative eligibility status for the new credit card to B-R2-P1.

At step 645, B-R2-P1 may provide eligibility status to electronic device 110, including terms and conditions for the new card.

At step 650, when the eligibility status is positive, electronic device 110 may then request provisioning of the new card. For example, a user may select an item on the electronic device that indicates agreement of the terms, and triggers step 650. In particular, electronic device 110 may provide a provisioning request to enable the card with the card identifier as an argument.

In response, at step 655, B-R2-P1 may create a link between the DPAN and the FPAN and provide the provisioning request to PNO-R2. In an embodiment, B-R2-P1 transmits the request for provisioning to PNO-R2, which generates the DPAN, and links the DPAN to the FPAN.

At step 660, B-R2-P1 may transmit a push notification, and in response at step 662, electronic device 110 obtains image data from B-R2-P1. The image data is associated with the second payment instrument undergoing activation and may also include a URL for another server in the system, which is referred to as trusted security manager for region 2, pod 1 (TSM-R2-P1), where a low-level personalization script for the new card will be hosted.

At step 665, PNO-R2 may send personalization information (with card art work, contact information, the DPAN, etc.) for the new card to TSM-R2-P1.

In response to a push notification per region at step 670, electronic device 110 may at step 675, use the URL to download the personalization script. After confirming the digital signature of the personalization script, electronic device 110 may use the personalization script to personalize or store the DPAN in the payment applet, a container on secure element 230 associated with the new card. When this operation is completed, the user may be able to see the new card in an application on electronic device 110.

After executing the personalization script, at step 680 electronic device 110 may communicate post personalization results (e.g., whether the DPAN was successfully stored in secure element 230) to indicate that the operation completed successfully to TSM-R2-P1. For example, the DPAN associated with the new card may be stored in a payment applet 234. In addition, there may be several DPANs, each associated with a different payment instrument and stored in a different applets 234.

The post personalization information may be provided to PNO-R2 at step 681. At step 685, TSM-R2-P1 transmits the post personalization results to B-R2-P1 of computer system 112-2, and instructs B-R2-P1 to activate the payment applet storing the DPAN of the new card on electronic device 110 via a push notification 690. At step 693, electronic device 110 obtains updated image data associated with the new card that is provisioned. The user may now use the payment applet associated with the provisioned card to conduct transactions, e.g., at least in region R2.

Figure 7:
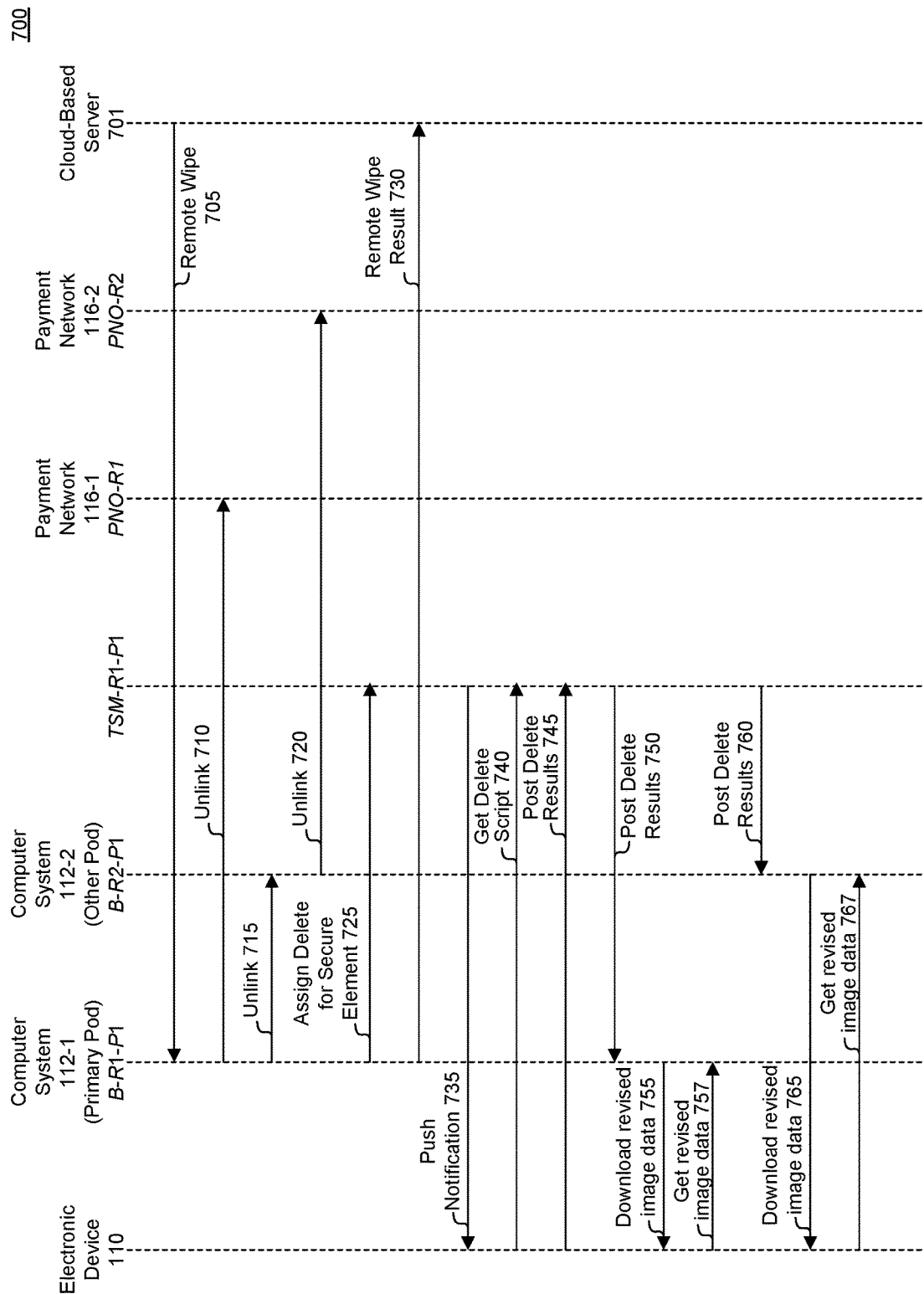
FIG. 7 illustrates removing payment instruments from different regions according to example embodiments of the disclosure.

An exemplary embodiment of unlinking the DPANs from the FPANs is shown in FIG. 7, which presents a drawing illustrating communication among one of the electronic devices and the computers in FIG. 1. (Unlinking may be performed to disable a provisioned payment instrument, e.g., if the electronic device is lost.) In particular, the user may initiate a remote delete by accessing cloud-based server 701. In response, this server may identify all the pods in which electronic device 110 is registered. However, the server may not know in which one the user is 'homed.' Consequently, the server may send a remote wipe request to a random pod (in which the user may or may not be registered). Then, this pod may forward the wipe request to a primary pod where the user and the electronic device registered for the first time.

In another embodiment, at step 705, cloud-based server 701 transmits a remote wipe request to a primary pod, B-R1-P1 of computer system 112-1. At step 710, primary pod, B-R1-P1, may transmit an unlink instruction to the associated PNO-R1 to make the DPANs inactive, e.g., unlink any DPANs associated with the electronic device and/or the user, from the corresponding FPANs.

In addition, at step 715, the primary pod, B-R1-P1, may forward an unlink request to pods associated with other regions, and at step 720, these secondary pod(s) may transmit unlink instructions to corresponding PNOs in the other regions. For example, the DPANs provisioned in other regions that are associated with electronic device 110 and/or the user may be unlinked from the corresponding FPANs via the associated PNOs.

At step 725, primary pod, B-R1-P1, may transmit a delete script to TSM-R1-P1, a trust security manager server associated with the primary pod, also called a primary TSM server. The delete script when executed causes one or more processors of secure element 230 to remove payment applet(s) 234, including payment applets whose DPANs may have been provisioned in different regions (e.g., not provisioned in R1). At step 730, primary pod, B-R1-P1, transmits a remote wipe result to cloud-based server 701.

At step 735, TSM-R1-P1, transmits a push notification to electronic device 110 at step 740 to obtain the delete script. Electronic device 110 deletes payment applet(s) 234 in secure element 230, and at step 745, transmits the results of the delete script back to TSM-R1-P1.

At step 750, TSM-R1-P1 transmits the results of the delete script to the primary pod, B-R1-P1, which at step 755, transmits a push notification. At step 757, electronic device 110 obtains revised image data associated with the payment instruments that were provisioned in R1.

At step 760, TSM-R1-P1, transmits the results of the delete script to other corresponding regions such as B-R2-P1 of computer system 112-2. At step 765, B-R2-P1 transmits a push notification. As a result, at step 767, electronic device 110 obtains revised image data from B-R2-P1, where the revised image data are associated with the payment instruments that were provisioned in R2.

In another embodiment, each pod may provide a delete script to clean-up containers in the secure element associated with the cards. Note that the deleting of data on electronic device 110 may be manually authorized by the user.

While the preceding discussion illustrated the provisioning technique with the financial data associated with different payment instruments stored on separate computers in different geographic locations, in some embodiments the financial data may be stored on a common computer if it is compatible with government regulations and if there is not an adverse impact on latency. For example, a user may be registered in the U.S. and may have provisioned a payment instrument that allows the user to conduct transactions in the U.S. The associated financial data may be stored on a computer associated with the U.S. region. If the user then adds a new payment instrument that allows the user to conduct transactions in Hong Kong, the associated financial data may be stored on a computer associated with the Hong Kong region. Because the financial data associated with the U.S. region can be stored anywhere, while the financial data associated with the Hong Kong region may need to be stored on the computer associated with the Hong Kong region, the system may decide to store all of the financial data in a unified manner on the computer associated with the Hong Kong region.

Figure 8:
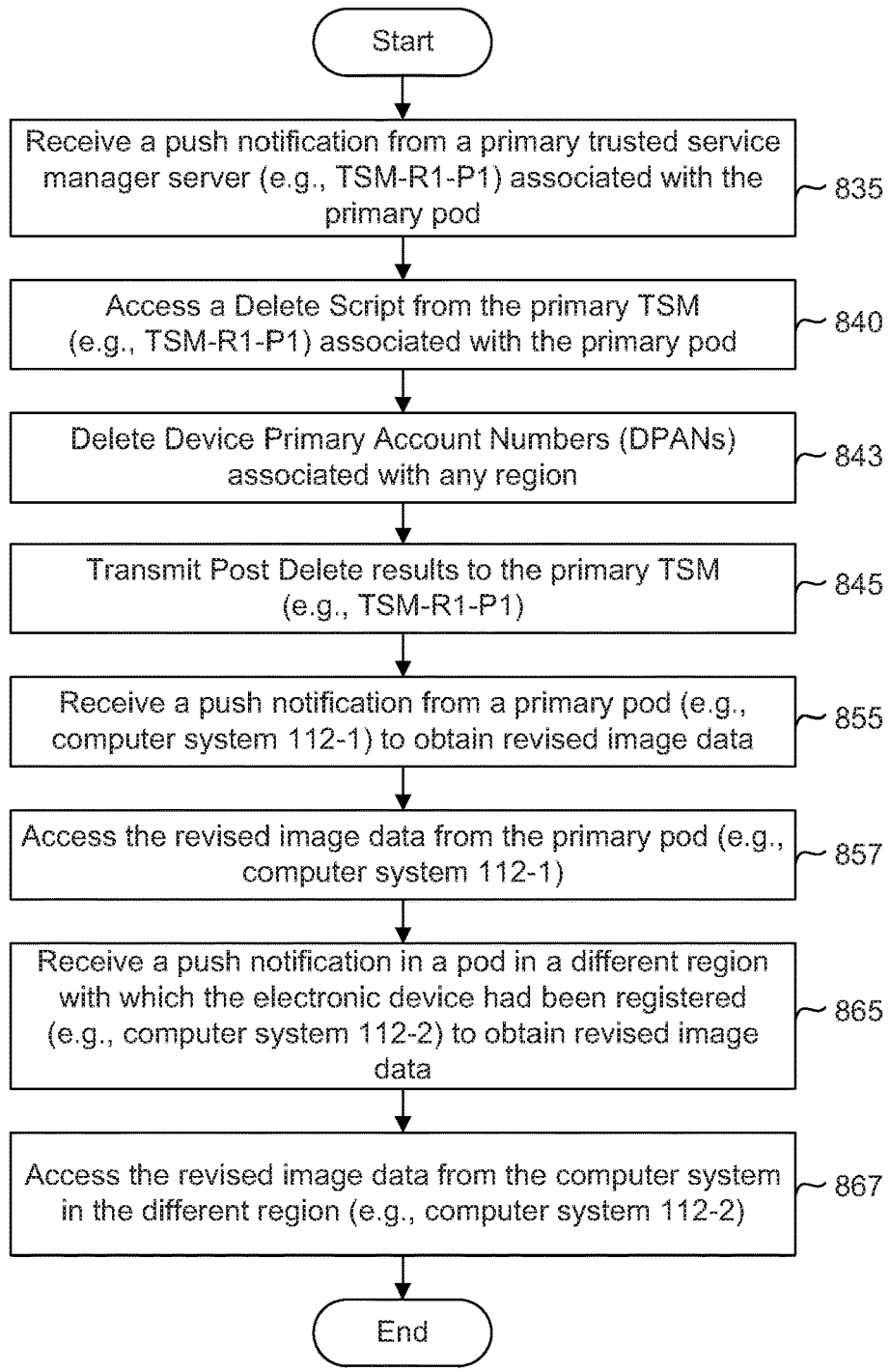
FIG. 8 illustrates a method for an electronic device for removing payment instruments from different regions, according to example embodiments of the disclosure.

FIG. 8 illustrates a method for an electronic device for removing payment instruments from different regions, according to example embodiments of the disclosure. Method 800 may be described using elements shown in FIGS. 1, 2, 6, and 7, in accordance with an example of the present disclosure.

Method 800 begins at step 835, where electronic device 110 receives a push notification from a primary trusted service manager server (e.g., TSM-R1-P1) associated with the primary pod, B-R1-P1.

At step 840, electronic device 110 accesses a Delete Script from the primary TSM (e.g., TSM-R1-P1) associated with the primary pod.

At step 843, electronic device 110 removes any payment instruments stored in secure element 230 that are provisioned from any region, not just R1 of the primary pod. For example, a payment instrument associated with a DPAN provisioned in R2, would also be deleted.

At step 845, electronic device 110 transmits delete results to the primary TSM server, TSM-R1-P1.

At step 855, electronic device 110 receives a push notification from the primary pod, B-R1-P1 to obtain revised image data.

At step 857, electronic device 110 accesses the revised image data from the primary pod that may include images and text indicating that the payment instruments provisioned in R1 are removed.

At step 865, electronic device 110 receives a push notification from a pod in a different region with which electronic device had been registered (e.g., B-R2-P1).

At step 867, in response to the push notification, electronic device 110 accesses revised image data from the pod in the different region that may indicate the previously provisioned payment instruments are removed.

Figure 9:
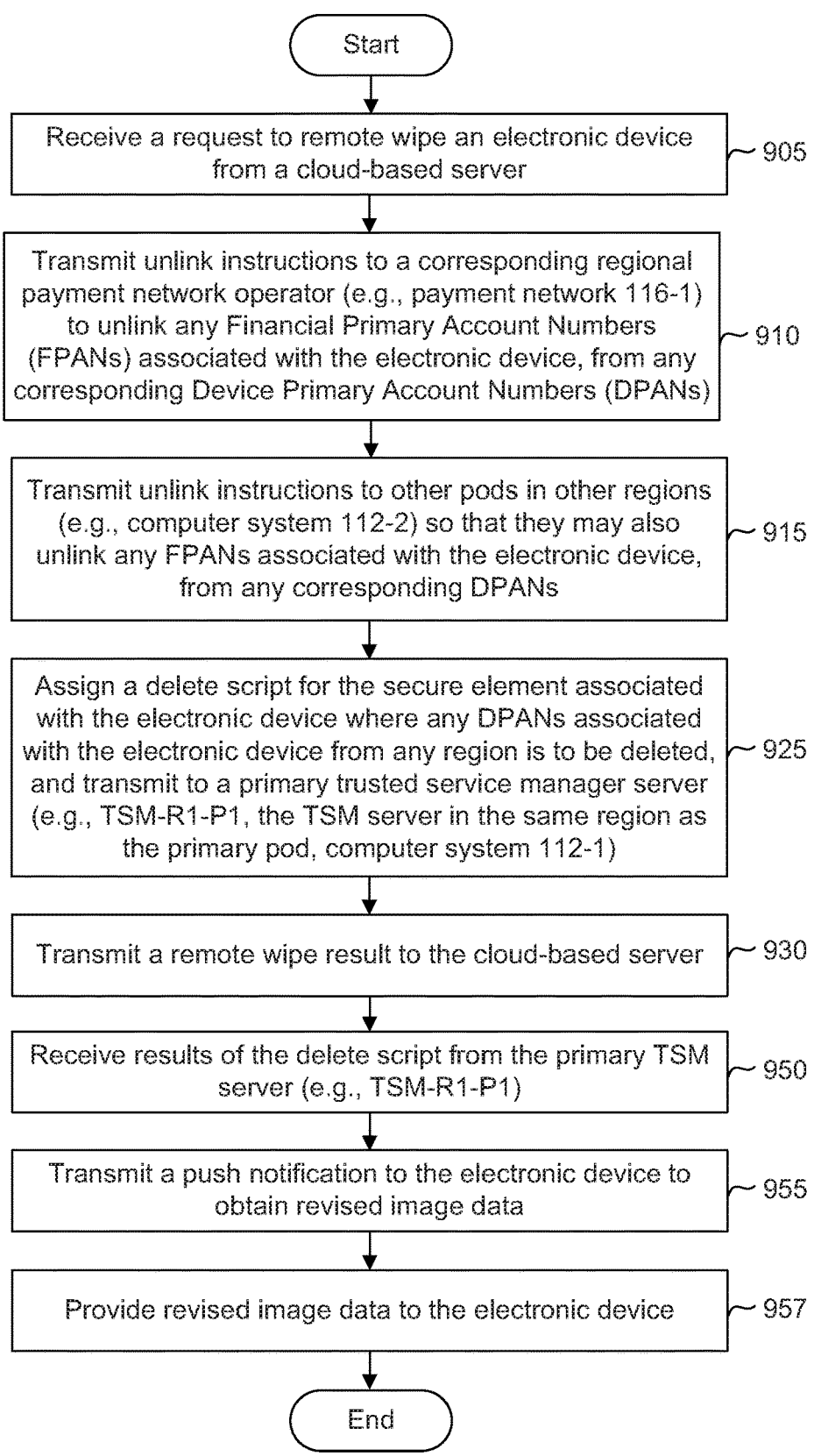
FIG. 9 illustrates a method for a computer system for removing payment instruments from different regions, according to example embodiments of the disclosure.

FIG. 9 illustrates a method for a computer system for removing payment instruments from different regions, according to example embodiments of the disclosure. In particular, method 900 is for removing payment instruments from electronic devices for which the computer is a primary pod. Method 900 may be described using elements shown in FIGS. 1, 2, 6, and 7, in accordance with an example of the present disclosure.

Method 900 begins at step 905 when the primary pod (e.g., B-R1-P1) receives a remote wipe request from a server, such as a cloud-based server. The remote wipe request identifies the electronic device 110 whose payments instruments are to be removed from electronic device 110.

At step 910, the primary pod transmits unlink instructions to a corresponding regional payment network operator (e.g., payment network 116-1) to unlink any Financial Primary Account Numbers (FPANs) associated with the electronic device, from any corresponding Device Primary Account Numbers (DPANs).

At step 915, the primary pod transmits unlink instructions to other pods in other regions (e.g., computer system 112-2); the other pods may communicate with corresponding PNOs to also unlink any FPANs associated with the electronic device, from any corresponding DPANs in that region.

At step 925, the primary pod assigns a delete script for the secure element 230 associated with electronic device 110 where any payment instruments associated with electronic device 110 from any region is to be deleted, and transmits the delete script to the primary trusted service manager server (e.g., TSM-R1-P1, the TSM server in the same region as the primary pod, B-R1-P1).

At step 930, the primary pod transmits a remote wipe result to the server that issued the remote wipe request.

At step 950, the primary pod receives results of the delete script executed in electronic device 110 (e.g., secure element 230) whether the deletion was successful.

At step 950, the primary pod transmits a push notification to electronic device 110 to obtain revised image data, and at step 957, the primary pod provides revised image data to the electronic device. For example, the revised image data may indicate the status of the deletion of the payment instruments from region 1. In another embodiment, the revised image data may indicate the status of the deletion of payment instruments from all regions where the user was registered.

Figure 10:
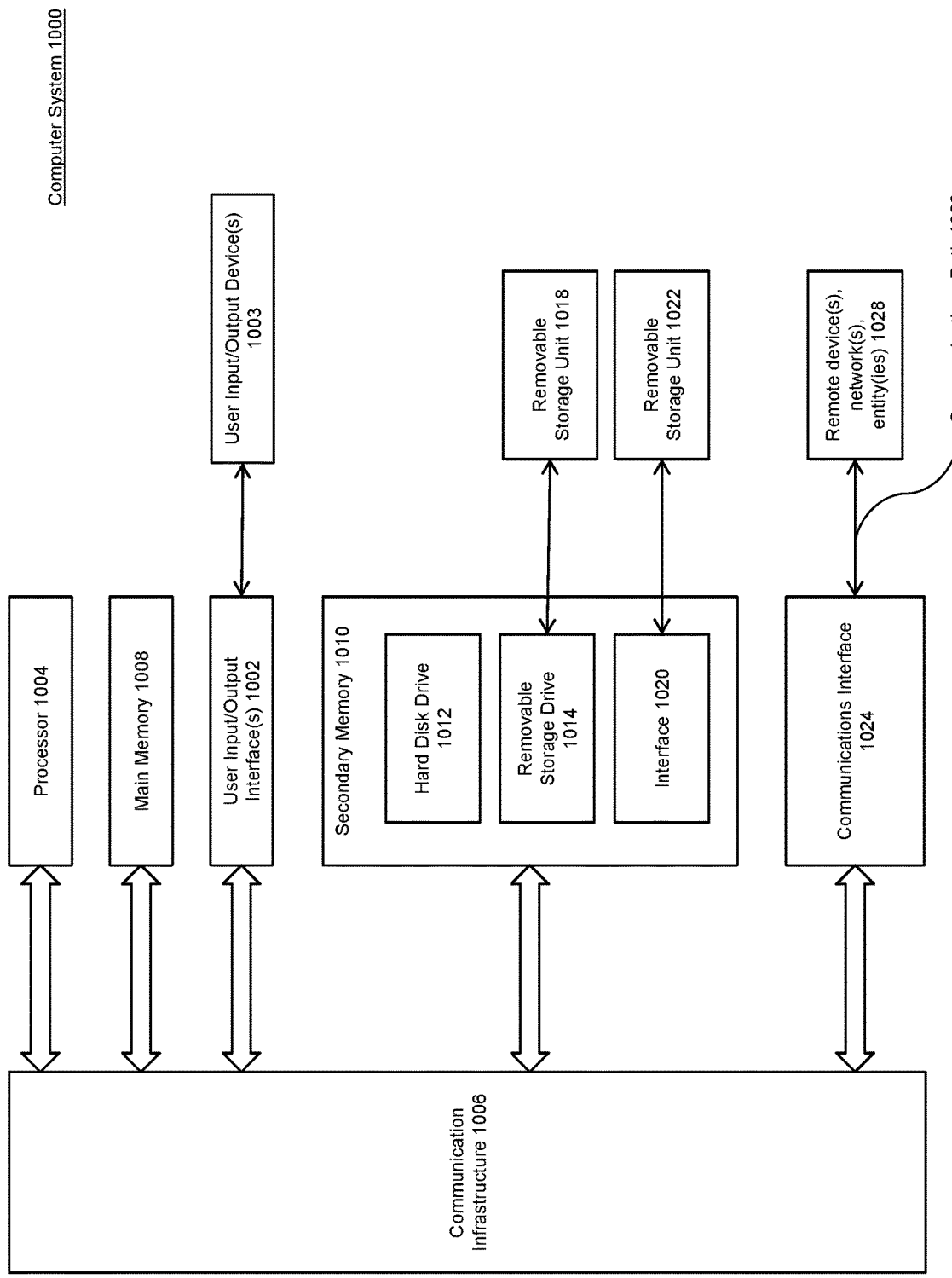
FIG. 10 is an example computer system useful for implementing various embodiments.

Various embodiments can be implemented, for example, using one or more well-known computer systems, such as computer system 1000 shown in FIG. 10. Computer system 1000 can be any well-known computer capable of performing the functions described herein. For example, and without limitation, processing system 210 (and/or other apparatuses and/or components shown in the figures) may be implemented using computer system 1000, or portions thereof.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. An electronic device, comprising:
   an interface circuit configured to communicate with one or more computers located throughout a plurality of regions;
   one or more processors coupled to the interface circuit; and
   a secure element, coupled to the one or more processors, comprising a payment instrument, wherein the payment instrument is not activated,
   wherein the one or more processors are configured to:
      access information associated with the payment instrutment;
      transmit via the interface circuit, a request to a first computer in a first region to activate the payment instrument;
      receive, via the interface circuit, redirect information from the first computer, wherein the redirect information identifies a second computer in a second region that can activate the payment instrument;
      based at least on the redirect information, transmit a message to activate the payment instrument via the interface circuit to the second computer in the second region;
      in response to the message, receive via the interface circuit, a first push notification from the second computer in the second region; and
      in response to the first push notification, access image data associated with the payment instrument being activated in the second region.

2. The electronic device of claim 1, wherein the one or more processors are further configured to:
   receive a second push notification from a trusted security manager (TSM) server in the second region associated with the payment instrument; and
   in response to the second push notification, access a personalized script from the TSM server in the second region, wherein the personalized script is associated with the payment instrument.

3. The electronic device of claim 2, wherein the one or more processors are further configured to: store the personalized script in the secure element of the electronic device, wherein the personalized script comprises art work, contact information, or a Device Primary Account Number (DPAN).

4. The electronic device of claim 3, wherein the one or more processors are further configured to: transmit an indication of whether the store of the personalized script was successful, to the TSM server in the second region.

5. The electronic device of claim 1, wherein the one or more processors are further configured to:
   access a delete script from a primary TSM server, wherein the primary TSM server is in the first region;
   delete the payment instrument according to the delete script; and
   transmit an indication of whether the delete script was successful, to the primary TSM server.

6. The electronic device of claim 5, wherein the one or more processors are further configured to:
   in response to the transmit, receive a second push notification from the second computer in the second region; and
   in response to receiving the second push notification, access revised data indicating that the payment instrument in the second region is removed.

7. A non-transitory computer-readable medium having instructions stored thereon, which when executed by a processor in an electronic device cause the processor to perform operations comprising:
   registering with a first computer in a first region;
   accessing a secure element comprising a payment instrument that is not activated in the first region;
   transmitting a request to the first computer to activate the payment instrument-;
   receiving redirect information from the first computer, wherein the redirect information identifies a second computer in a second region that can activate the payment instrument;
   based at least on the redirect information, transmitting a message to activate the payment instrument to the second computer in the second region;
   in response to the transmitting the message, receiving a first push notification from the second computer in the second region; and
   in response to the first push notification, accessing image data associated with the payment instrument being activated in the second region.

8. The non-transitory computer-readable medium of claim 7, wherein the operations further comprise:
   receiving a second push notification from a trusted security manager (TSM) server in the second region associated with the payment instrument; and
   in response to the second push notification, accessing a personalized script associated with the payment instrument from the TSM server in the second region.

9. The non-transitory computer-readable medium of claim 8, wherein the operations further comprise: storing the personalized script in the secure element of the electronic device.

10. The non-transitory computer-readable medium of claim 7, wherein the operations further comprise:
transmitting an indication of whether the storing was successful, to the TSM server in the second region; and
in response to the transmitting results, accessing data associated with the payment instrument activated in the second region.

11. The non-transitory computer-readable medium of claim 7, wherein the operations further comprise:
accessing a list of different regions available to the electronic device for registration.

12. The non-transitory computer-readable medium of claim 7, wherein the operations further comprise:
accessing a delete script from a primary TSM server, wherein the primary TSM server is in the first region;
deleting the payment instrument according to the delete script; and
transmitting an indication of whether the delete script was successful, to the primary TSM server.

13. The non-transitory computer-readable medium of claim 7, wherein the operations further comprise:
presenting, in a unified view, information associated with the payment instrument and information associated with a second payment instrument supported in the first region.

14. The electronic device of claim 1, wherein the one or more processors are further configured to register the electronic device in the first region, and wherein the image data associated with the payment instrument comprises an audible sound or animation indicating that the payment instrument is undergoing activation.

15. The electronic device of claim 1, wherein the one or more processors are further configured to access second information associated with a second payment instrument that is activated in the first region.

16. The electronic device of claim 15, wherein the one or more processors are configured to:
present, in a unified view, information associated with the payment instrument activated in the second region and information associated with the second payment instrument activated in the first region.

17. The electronic device of claim 1, wherein the first and second regions are in different countries.

18. The electronic device of claim 5, wherein the one or more processors are further configured to:
in response to transmitting the indication, receive a second push notification from the first computer in the first region; and
in response to receiving the second push notification, access revised data indicating that a second payment instrument in the first region is removed.

19. The electronic device of claim 1, wherein the one or more processors are further configured to:
request an eligibility check of the second payment instrument; and
in response to requesting the eligibility check, receive an eligibility status of the second payment instrument.

20. The electronic device of claim 19, wherein the eligibility check includes determining whether the second payment type is active or eligible for activation.

* * * * *